United States Patent [19]

Crouch et al.

[11] Patent Number: 4,567,325

[45] Date of Patent: Jan. 28, 1986

[54] CONTROLLER FOR A COIN TELEPHONE SET

[75] Inventors: Paul E. Crouch, Freehold, N.J.; Joseph J. Nahas, Wyomissing Hills, Pa.; Howard Ng, Old Bridge, N.J.

[73] Assignees: AT&T Technologies Inc.; AT&T Bell Laboratories, both of Murray Hill, N.J. ; a part interest

[21] Appl. No.: 567,052

[22] Filed: Dec. 30, 1983

[51] Int. Cl.[4] .......................................... H04M 17/00
[52] U.S. Cl. ................................ 179/6.3 R; 179/27 G
[58] Field of Search ...................... 179/6.3 R, 175.2 C, 179/175.2 D, 175.2 R, 27 G; 194/1 N, 44, 100 A, 101, 102

[56] References Cited

U.S. PATENT DOCUMENTS

| | | | |
|---|---|---|---|
| 3,682,286 | 8/1972 | Prumm | 194/100 |
| 3,741,363 | 6/1973 | Hinterstocker | 194/100 |
| 3,804,984 | 4/1974 | Yachabach | 179/6.3 R |
| 4,039,768 | 8/1977 | O'Maley | 179/175.2 C |
| 4,105,867 | 8/1978 | Levasseur et al. | 179/6.3 R |
| 4,136,262 | 1/1979 | Clark, Jr. | 179/6.3 R |
| 4,196,318 | 4/1980 | Nelson | 179/84 |
| 4,352,958 | 10/1982 | Davis et al. | 179/84 |

FOREIGN PATENT DOCUMENTS 12102  6/1980  European Pat. Off. .......... 179/6.3 R

OTHER PUBLICATIONS

Klausen, "Coin Box Telephones", *Ericsson Reviews*, No. 2, 1983, pp. 73-79.
*Post Office Telecommunications Journal*, vol. 31, No. 3, Autumn, 1979, pp. 4-6, L. L. Grey, "New Payphones take the Credit".
*Electrical Communication*, vol. 52, No. 3, 1977, pp. 213-218, D. Adolphs, "NT2000 Coin Telephone Using Microprocessor Techniques".

*Primary Examiner*—Gene Z. Rubinson
*Assistant Examiner*—Elio DiVito
*Attorney, Agent, or Firm*—Samuel R. Williamson

[57] ABSTRACT

A microcomputer controlled coin telephone set prevents coin call fraud and also checks the operational readiness of the telephone set to prevent the acceptance of coins into a hopper for later collection by a coin box unless or until the set is fully functional. Capable of being interrogated remotely, a local memory is used for storing coin deposit information and generating coin deposit signals in order of deposit to a central office. In those instances where the line power drops below that necessary for full operation as a coin telephone, low power sensing circuits convert the telephone to the POTS mode which allows speech and dialing capabilities. Similarly, any type of chute failure, or a full hopper causes the telephone to revert to the POTS mode. While in the POTS mode, any coins deposited in the telephone are returned to the customer.

13 Claims, 25 Drawing Figures

LOOP STATUS LOGIC

INITIALIZATION

FIG. 14
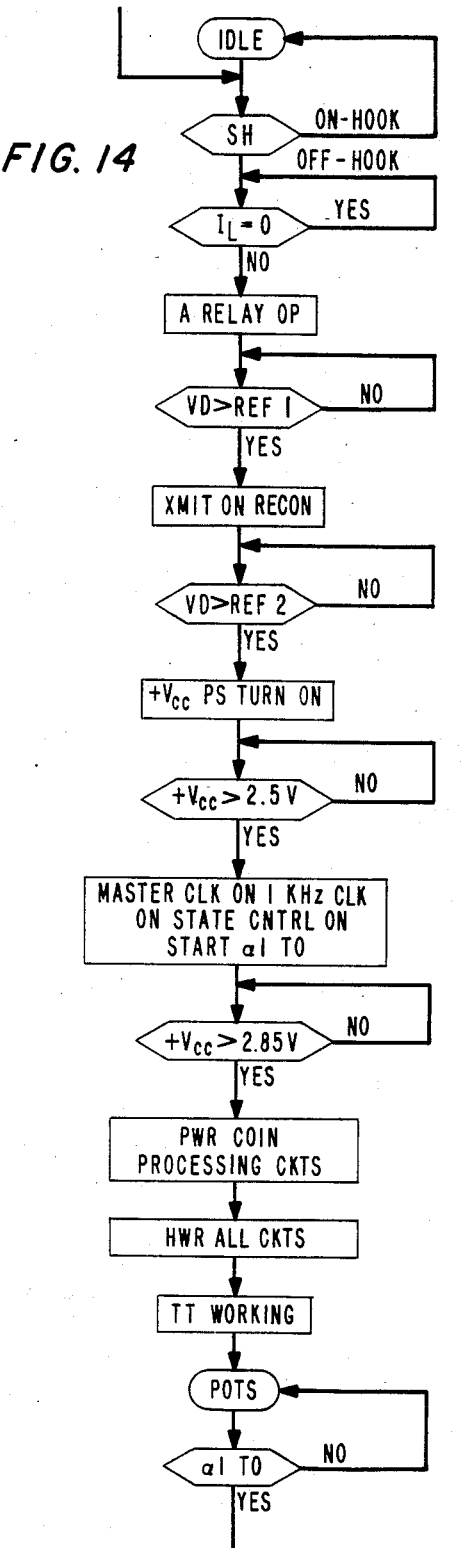
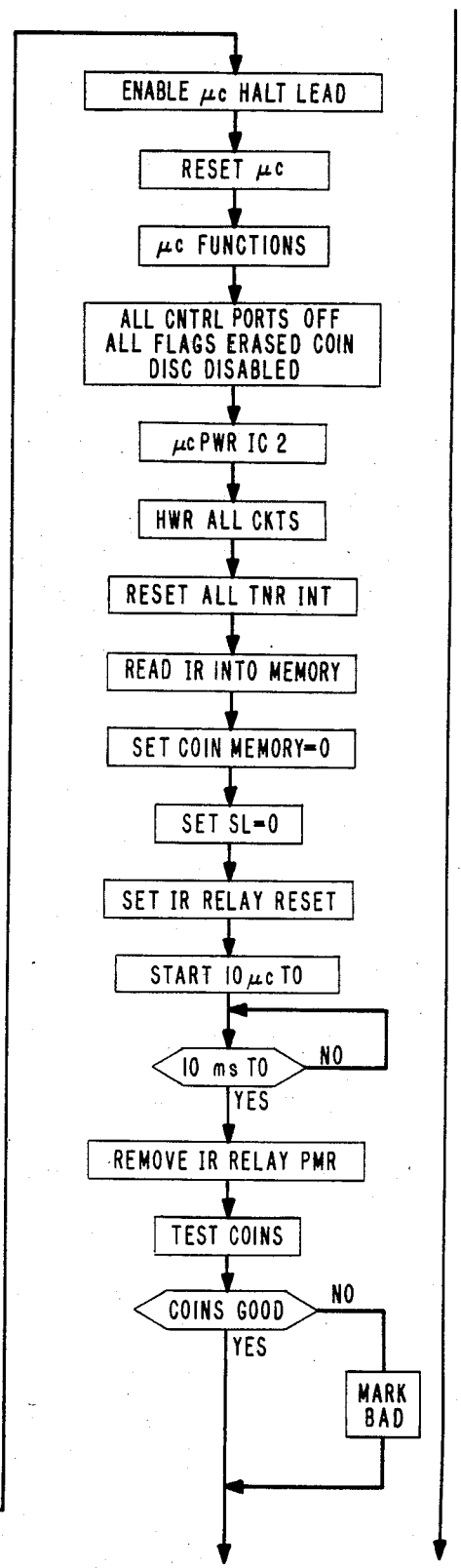

COIN GOING ROUTINE

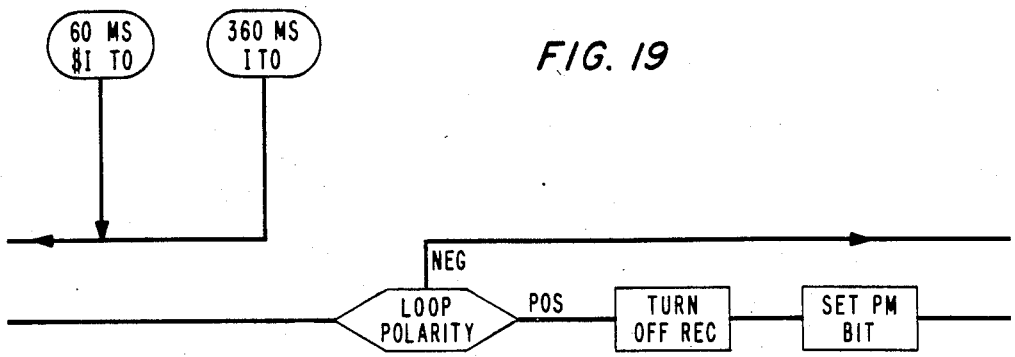
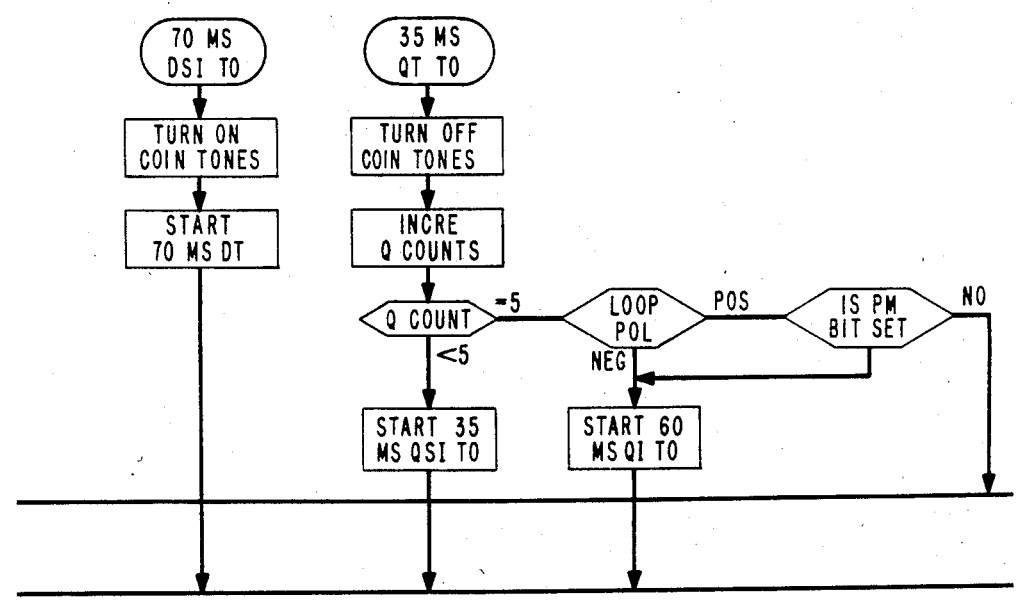
FIG. 19

CONTROLLER FOR A COIN TELEPHONE SET

BACKGROUND OF THE INVENTION

1. Technical Field

This invention relates to coin telephone station apparatus and more particularly to a line powered controller for a coin telephone set.

2. Description of the Prior Art

Telephone company improvement programs in the last decade have resulted in a multitude of coin service innovations which better serve customer needs and reduce operating costs. Illustratively, the programs have modified coin service from prepay to dial-tone-first operation and have provided free coin service for special numbers, such as the "911" emergency code. In addition, single slot paystations have been introduced for flexibility in deposits, improved transmission, and reductions in vandalism and theft. Such a single slot phone uses a solid state totalizer circuit which counts the coin deposits and outpulses respective tone pulses for each type of coin for facilitating more automatic coin call processing. Significantly, the introduction of TSPS (Traffic Service Position System) and its integrated ACTS (Automatic Coin Telephone System) substantially aid the more efficient and less costly serving of coin calls with significantly reduced operator assistance.

Despite the improvements achieved through the foregoing programs, telephone companies have not adequately solved the problem of reliably determining the operational state of public telephones without dispatching a repair person to the site of the telephone. Many of these telephones are remotely located in open and sometimes harsh environments. Moreover, all are not always found to be inoperative when a repair person visits. Hence, the scheduling of maintenance on coin telephones is an inefficient and costly procedure for the telephone companies.

In view of the foregoing, it is desirable to have a coin telephone set compatible with the existing telephone system by being operable with loop power from the central office, yet sophisticated enough to perform extensive operational checks which include determining if the set is fully functional before operating as a coin telephone. It is also desirable to have a telephone set that will notify the central office of its inoperable condition, yet when the failure permits, still allows for limited operation.

SUMMARY OF THE INVENTION

In the present invention, a microcomputer controlled coin telephone set utilizes electronics to eliminate much of the electro-mechanical complexity of existing coin sets. Under the control of a microcomputer, the set prevents coin call fraud and performs all of the coin discrimination functions. The microcomputer also checks the operational readiness of the telephone set to prevent the acceptance of coins into a hopper for later collection by a coin box unless or until the set is fully functional. Capable of being interrogated remotely, a local memory is used for storing coin deposit information and generating coin deposit signals in order of deposit to a central office.

In those instances where the line power drops below that necessary for full operation as a coin telephone, low power sensing circuits convert the telephone to the Plain Old Telephone Set (POTS) mode which allows speech and dialing capabilities. Similarly, any type of chute failure, or a full hopper causes the telephone to revert to the POTS mode. While in the POTS mode, any coins deposited in the telephone are returned to the customer.

When loop current disappears or diminishes below a workable level, this condition is detected and all but the essential circuitry in the telephone is turned off to conserve power during the interruption or reduced current level. If a collect or refund signal from the central office is received by the telephone while in the low power operating condition, this signal is stored. When sufficient loop current returns and a collect signal is present, coin tones for all coin information stored in the memory and has not been previously transmitted are transmitted in sequence to the central office. If a refund signal is present, coins are returned to the customer.

In accordance with the invention, service calls to service an operating telephone are minimized by automatic trouble reporting circuitry incorporated in the telephone set. On each call origination, a stuck coin indication is initially provided to the central office while the microcomputer automatically checks the telephone circuitry and coin chute to determine if they are operational. If they are found operational, the stuck coin indication is removed. If the microcomputer finds that either the circuitry or chute is not operational, however, it will leave the stuck coin indication to let the central office know that the set is not functioning as a coin station and that a repair visit is required. Nonpay calls may continue to be made from the set if the type of failure permits. The microcomputer continually checks the chute during the duration of subsequent calls made while in the POTS mode. If for some reason a chute trouble clears itself, the microcomputer removes the stuck coin indication and the set again functions as a coin telephone.

The invention will be more fully comprehended from the following detailed description and the accompanying drawing in which:

FIGS. 12 through 20 is a flow chart of some of the functions performed by the circuitry of FIG. 1;

FIG. 21 is the spacial arrangement of FIGS. 12 through 15;

FIG. 22 is the spacial arrangement of FIGS. 18 through 20;

FIG. 23 illustrates the spacial arrangements of FIGS. 1 and 2;

FIG. 24 illustrates the spacial arrangement of FIGS. 3 and 4; and

FIG. 25 illustrates the spacial arrangements of FIGS. 5 through 10.

DETAILED DESCRIPTION

Figure 1:
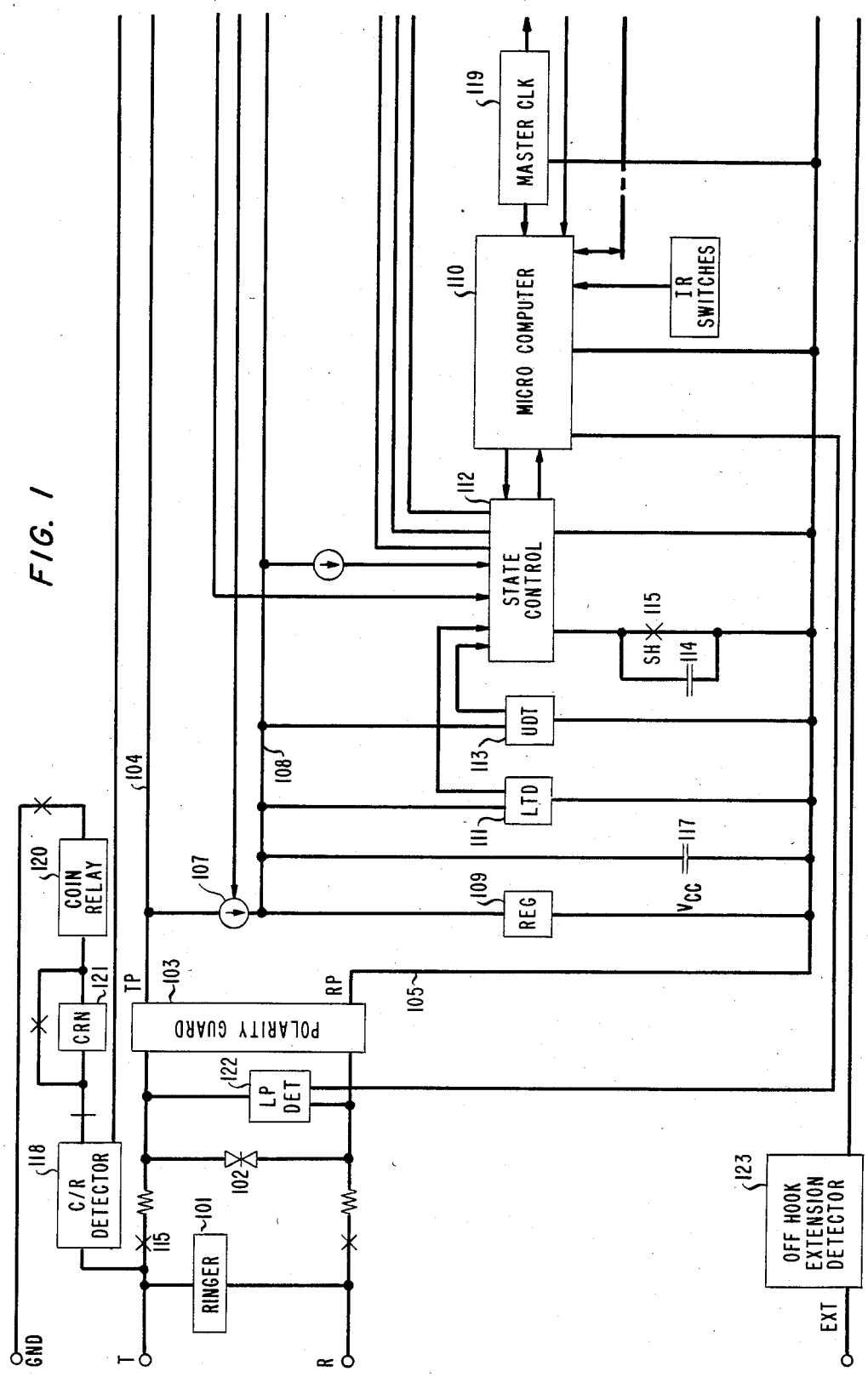
FIGS. 1 and 2 show a block diagram of the major functional components of the electronic coin telephone set.
Figure 2:
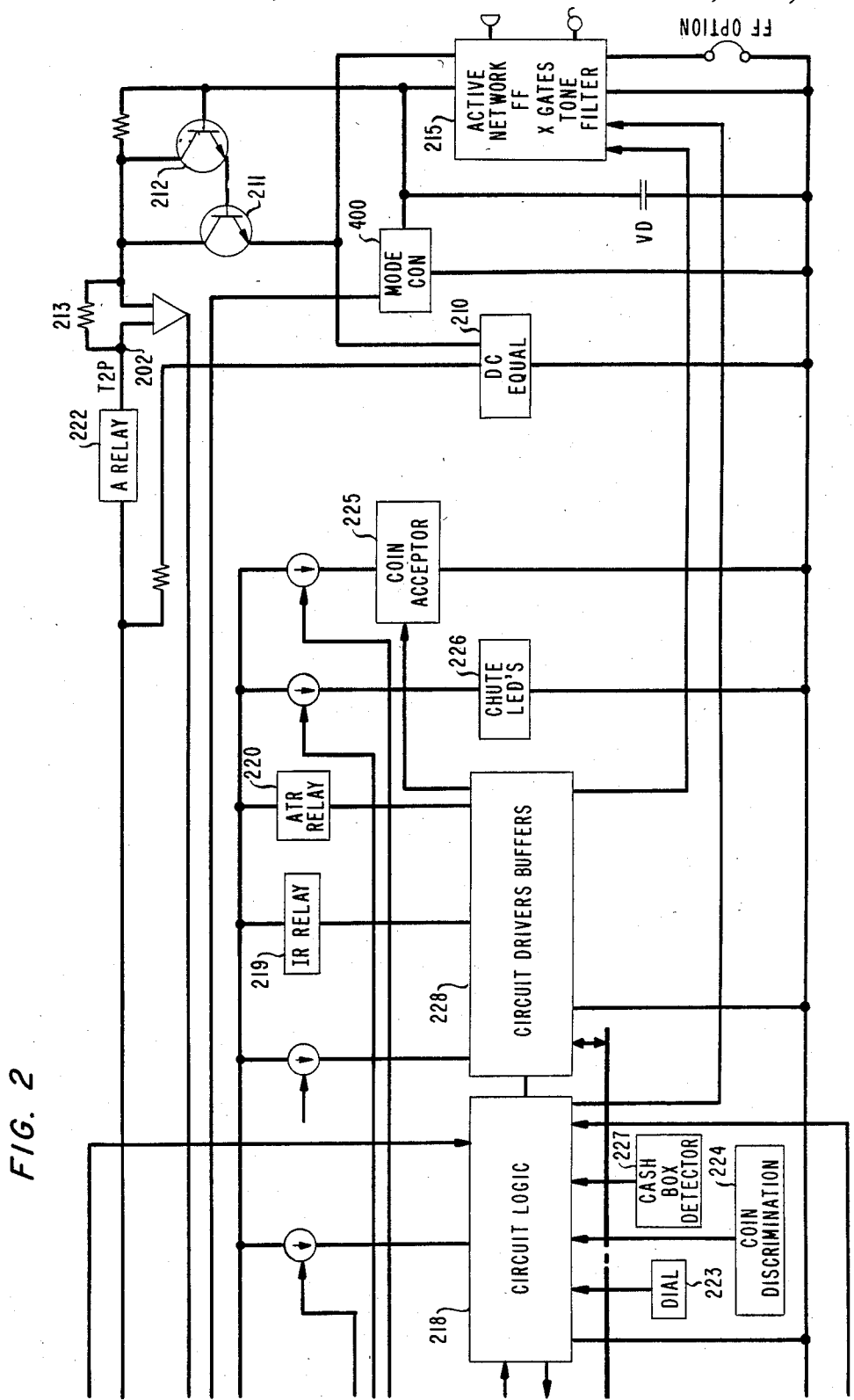

Referring now to FIGS. 1 and 2 of the drawing, in accordance with the present invention there is shown a block diagram of an electronic coin telephone with a ringer 101, a varistor 102 and a polarity guard 103 which are included to show an illustrative connection between a coin-operated telephone in accordance with the invention and the tip and ring terminals of a telephone line. Operating under the control of a microcomputer 110, the acceptance of coins into the hopper is prevented unless or until the set is fully functional. This is determined by the microcomputer 110 performing operational readiness checks on the coin chute and all coin processing circuitry.

Also contained in the telephone set are a collect or refund detector 118 that senses when the set receives a collect or refund voltage from the central office. This information is provided to a circuit logic section which, in turn, either activates a coin relay 120 and collects the coins deposited or returns them to the customer.

A VCC current supply 107 supplies a constant 14 mA of current to feed the VCC rail 108. It is turned on and off by the mode control circuitry 400 thereby allowing the active network 215 to go to a speech-only mode when insufficient loop current is available. The telephone then operates as a Plain Old Telephone Service (POTS) set with speech and dialing capabilities. A voltage regulator 109 is used to regulate the VCC rail to the desired voltage. Any excess current from the VCC current source 107 that is not used by the microcomputer 110 or the other circuits will be dissipated by the voltage regulator 109. A lower threshold detector 111 determines if the VCC rail 108 is above a predetermined lower threshold voltage of 2.5 volts. The output of this detector is used by a state control 112 to sequence the state of the telephone set. An upper threshold detector 113 is identical to the lower threshold detector 111 with the exception that it has a higher predetermined threshold, instead of 2.5 V as its threshold. The output of this detector is also provided to the state control 112.

The state control 112 sequences the logic circuits in the telephone set in the proper states according to loop power and system requirements. This section provides a control of power to the logic circuits by turning on and off the associated power supplies as appropriate and also enable other coin processing circuits. The state control also provides an interface to the microcomputer 110 control lines. These lines are used to reset the microcomputer 110 and also to hold it in a low power state. They are also used to interrupt the microcomputer 110 due to timer timeout, external interruption, or finally informs the microcomputer that loop power disappeared so that it can start a power down sequence.

The state control 112 also retains status of the system during loop power interruptions through two internal memory latches—a collect or refund (CR) latch and a sleep latch. The sleep latch is designed as a memory element that informs the microcomputer 110 whether the loop interruption was long enough to warrant a new call origination or just a short interruption (same call). The CR latch informs the microcomputer 110 whether a collect or refund signal was present. And lastly, the state control generates a power-on-reset signal to all logic circuits on the telephone set whenever they are turned on.

A DC equalization circuit (DCE) 210 establishes the voltage-current characteristics of the telephone set. This is accomplished by effectively switching between DC loads as a function of set voltage. When the power available to the set exceeds the total power required for each mode of operation the remaining power is dissipated by the DC equalization circuit. Monitoring the set input voltage, the DC equalization circuit maintains a minimum set operate voltage in the full-feature mode.

The DC equalization circuit is comprised of two current shunt branches, a low current and a high current branch. The low current branch provides the level shifting required to maintain the minimum full-feature set voltage. At the point where this voltage is reached the high current shunt branch becomes active. The current in this branch is sensed by the mode control circuit 400 and used to determine when sufficient power is available to switch into the full-feature mode of operation.

The high current branch connects to TP on lead 104 and the low current branch connects via a Darlington pair transistor 211 and 212 and a resistor 213 on lead 202.

The loop polarity detector 122 monitors the polarity of the telephone line and provides a signal indication to the microcomputer 110 whenever the polarity is positive. And off-hook extension detector 123 provides a control signal to the circuit logic 218 whenever an extension telephone is off-hook. The A relay 222 operates whenever loop current is present by removing the station ground, and replacing the ground when loop current is not present.

For tone dialing, a dial 223 is incorporated into the telephone set. Dials suitable for such use are known in the art. Two such dials are respectively disclosed in U.S. Pat. No. 4,196,318 issued to D. H. Nelson on Apr. 1, 1980 and U.S. Pat. No. 4,352,958 issued to P. C. Davis et al. on Oct. 5, 1982.

A coin discrimination circuit 224 is provided for checking the material composition of the coin for determining if the coin deposited is valid or rather some type of slug. In addition, the circuit also uses chute LEDs 226 to measure the size of the coins. Coin discrimination arrangements are known and are presently available in the art. Two such arrangements suitable for use in the coin discrimination circuit are disclosed in U.S. Pat. No. 3,741,363 issued to A. Hinterstocker on June 26, 1973 and U.S. Pat. No. 3,682,286 issued to G. Prumm on Aug. 8, 1972.

Under the control of the microcomputer 110, coin acceptor circuitry 225 is provided for operation of the coin relay 120. An operate signal to this relay will cause coins tested good by the coin discrimination circuit 224 to be placed into the hopper.

In order to provide for accurate cashbox accounting, the cash box detector 227 is provided. It comprises a mechanical switch whose state is changed each time the cash box vault door is removed. This arrangement provides for transmitting 1700 Hz and 2200 Hz for all coin tones until the cash box is changed, at which time the frequencies will change to 1537 Hz and 2200 Hz for the duration that the cash box is installed in the set. When the cash box is again changed, the set will revert back to 1700 Hz and 2200 Hz until the cash box is changed again.

A switchhook timer is part of the circuitry 218 and is used to time the length of time that the handset is on-hook. If that time exceeds a predetermined time, the temporary as well as permanent microcomputer memories are erased and a new call is assumed. The circuit uses a current source to charge capacitor 114 when the switchhook 115 is in the on-hook position. A comparator circuit then monitors the voltage of the capacitor 114. The current source and the capacitor values are chosen such that the desired predetermined time elapses in charging the capacitor to 1.5 V. When the capacitor charges up to this potential, the output of the comparator goes high, indicating that the desired time has elapsed since the handset has been on-hook.

When the handset is off-hook, the capacitor 114 is shorted to ground. The charging of the capacitor is prevented thereby and it never reaches 1.5 V.

Logic power supplies are used in providing the necessary power to the BIL logic gates used in the telephone set. There are two rails on which power must be supplied. A 1.2 V rail is supplied to the logic and is the positive voltage rail of the logic. A constant current source going to ground must be supplied to the BIL gates to feed the injectors. The L1 rail powers the logic that must stay alive during the sleep period. This is to ensure an orderly shutdown of circuits and an orderly recovery during loop interruptions.

Active pull up and pull down circuitries are also incorporated within the power supplies. They are used in the state control and in the other logic supplies in order to keep transistors in these circuits in a known state when power is removed from their base lead.

Figure 3:
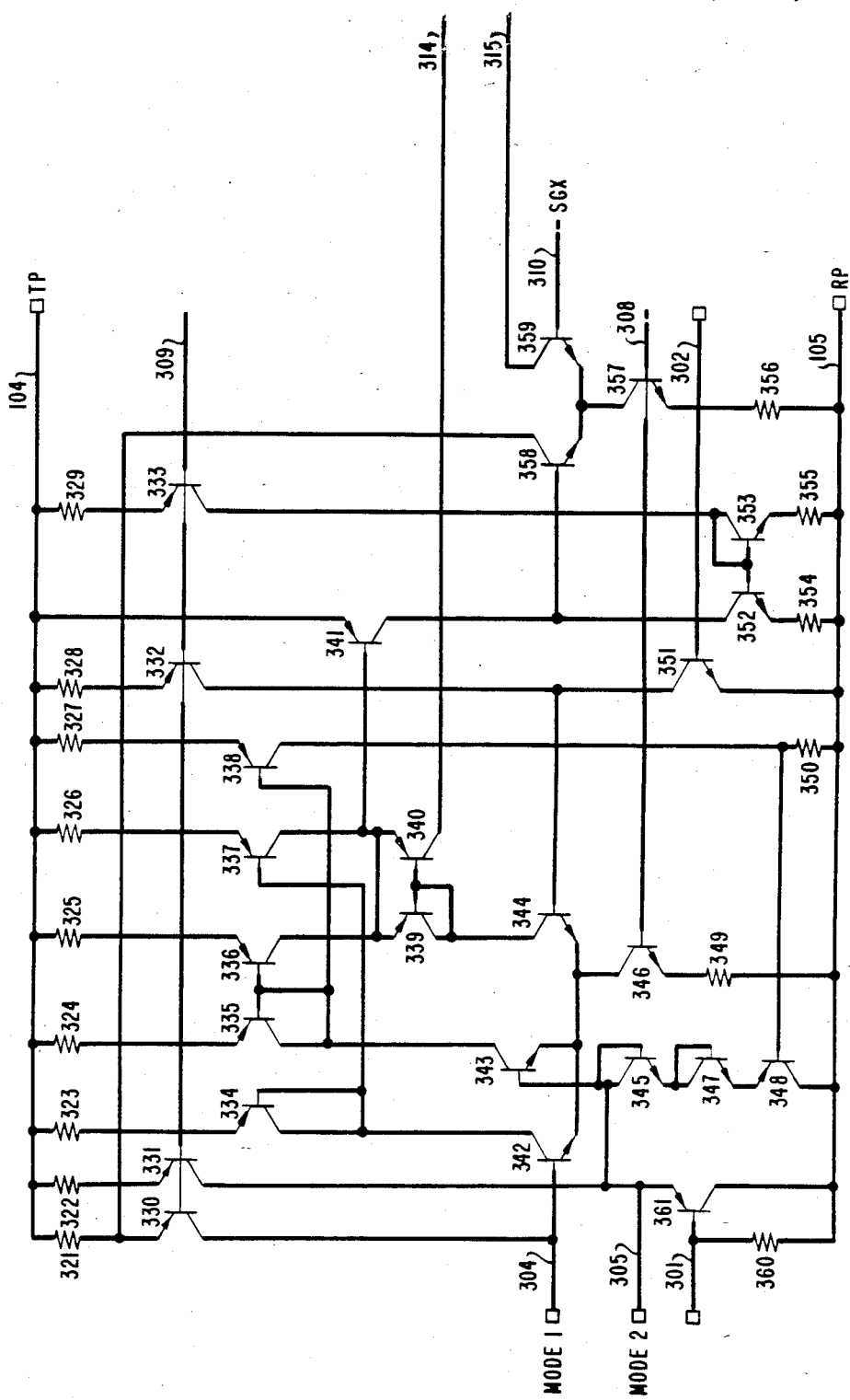
FIGS. 3 and 4 show a detailed schematic of the mode detector employed in this invention.
Figure 4:
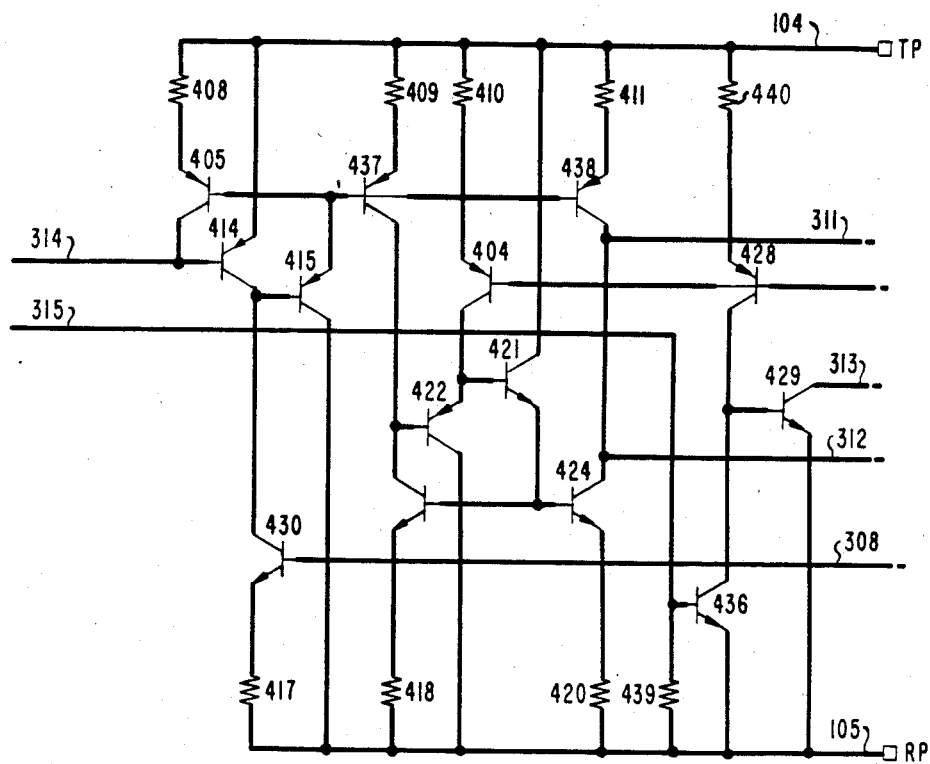
Figure 5:
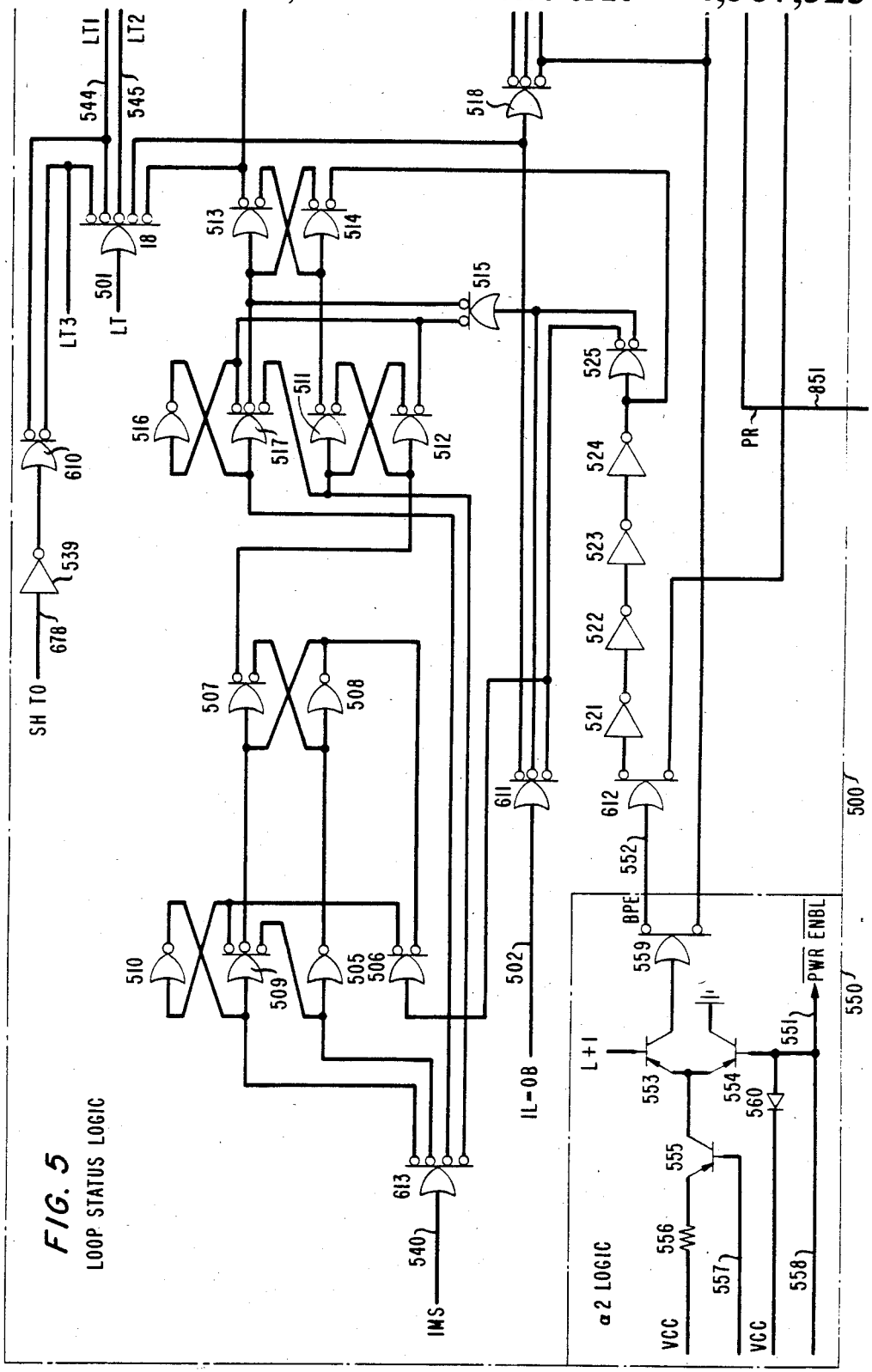
FIGS. 5 through 10 illustrate the logic circuitry of the state control employed in this invention.
Figure 6:
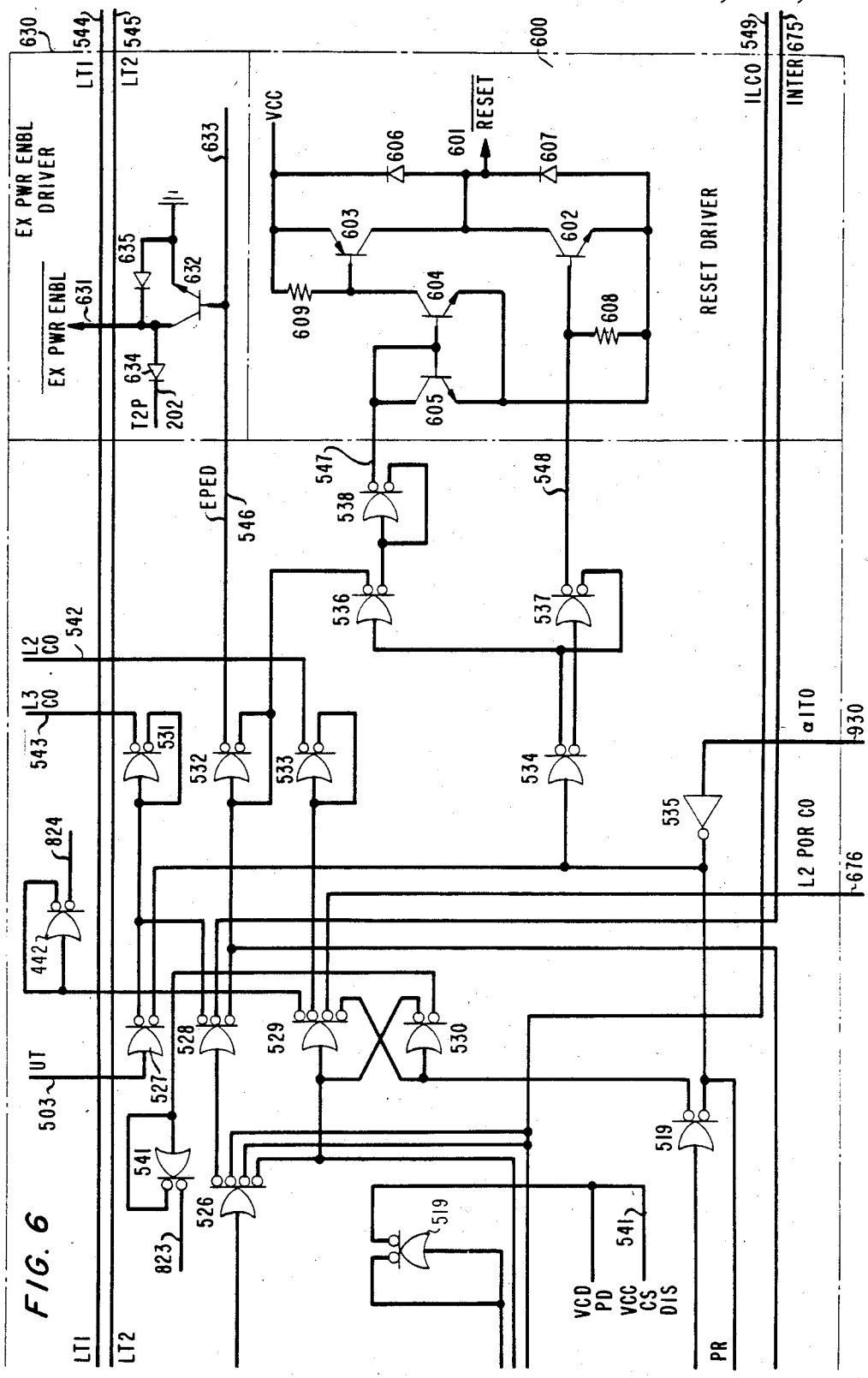
Figure 7:
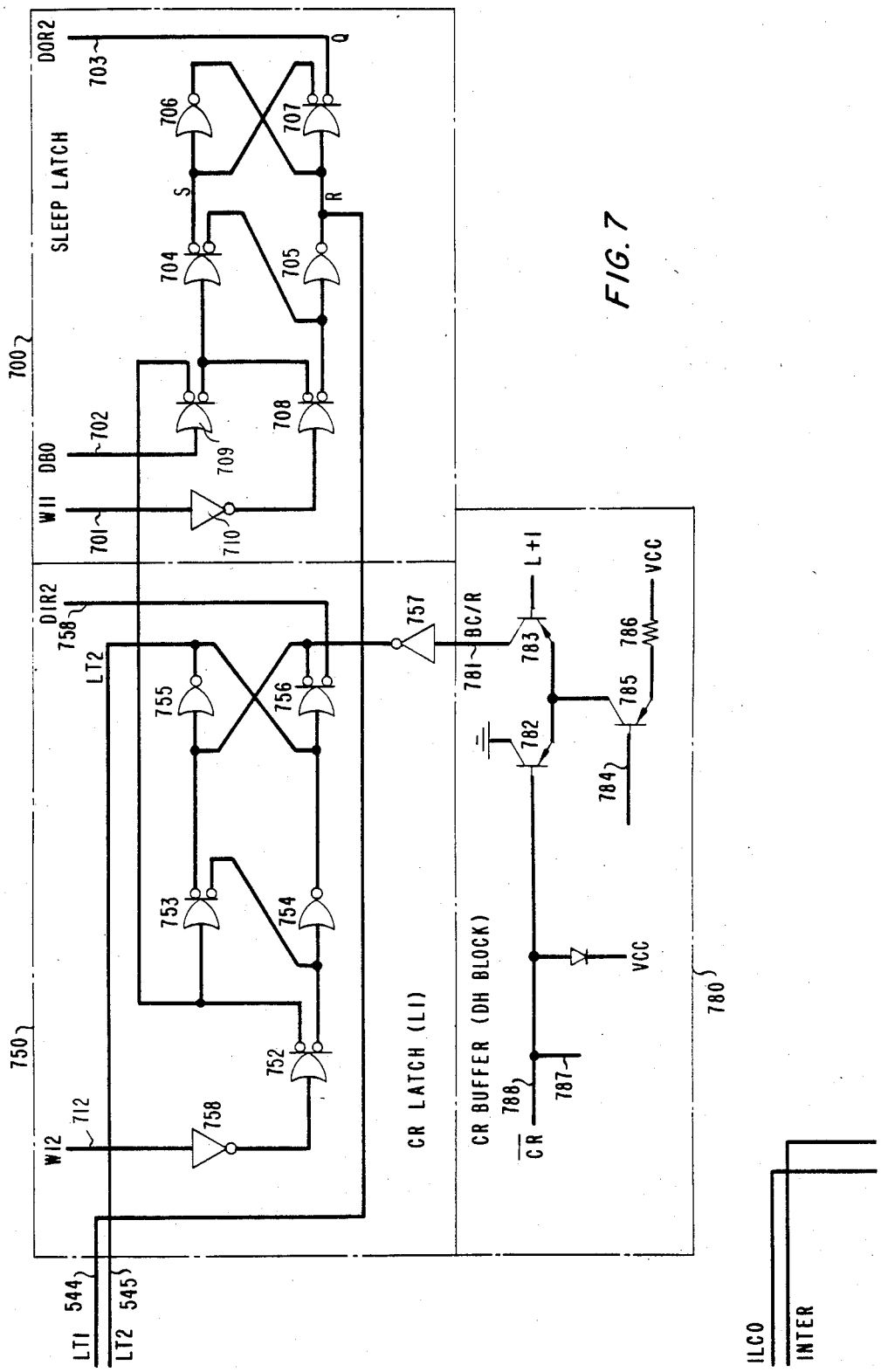
Figure 8:
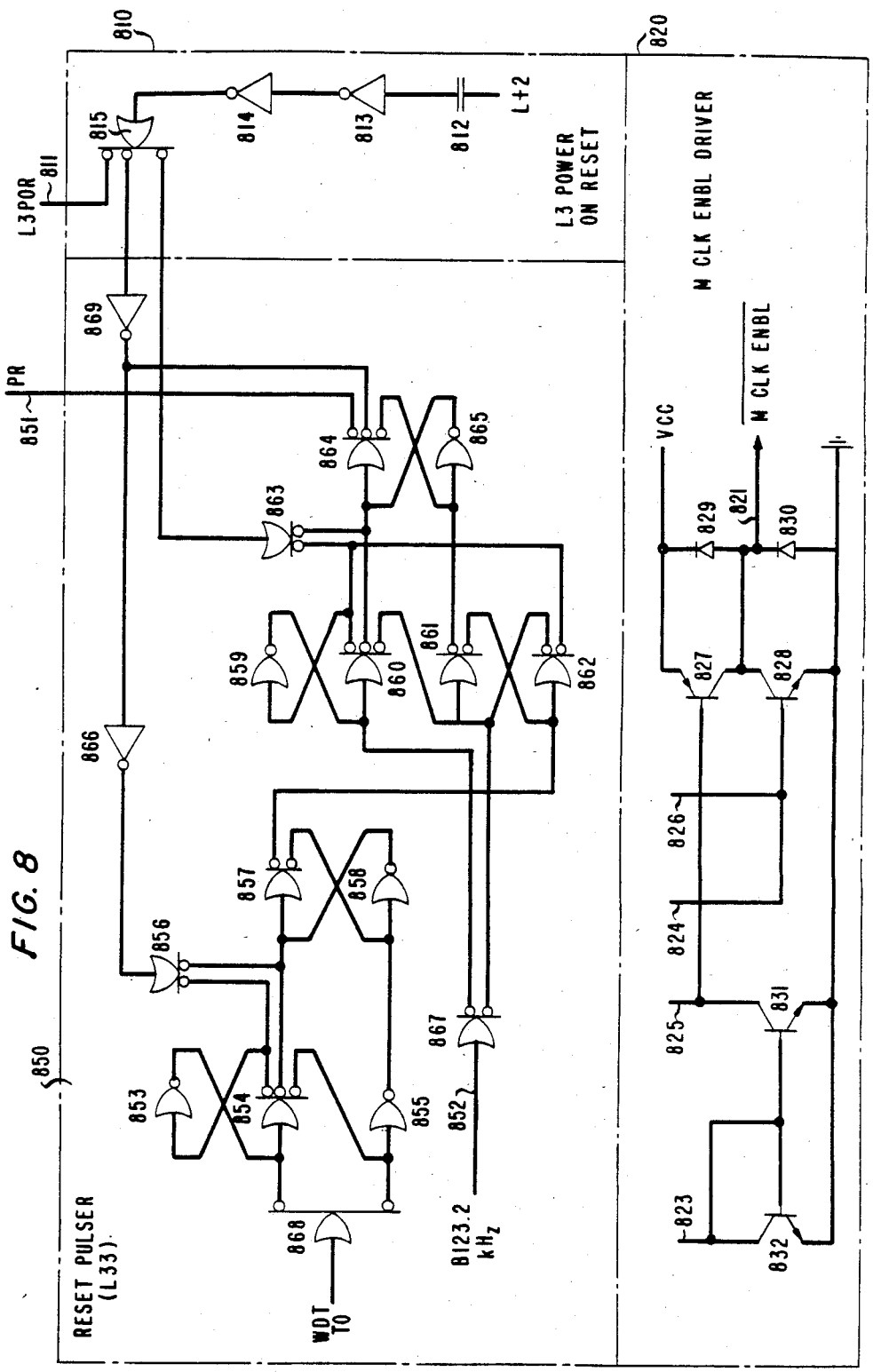
Figure 9:
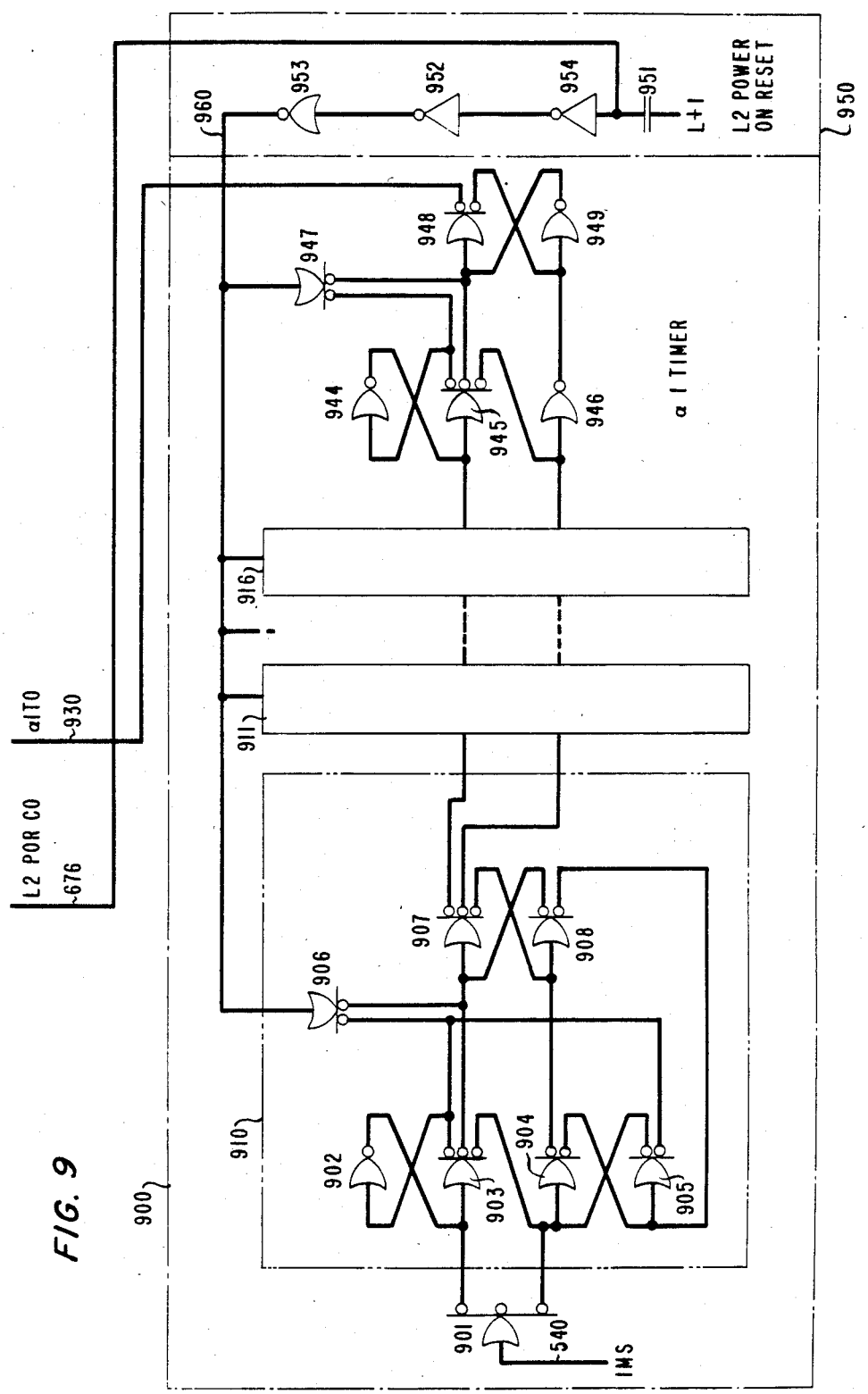
Figure 10:
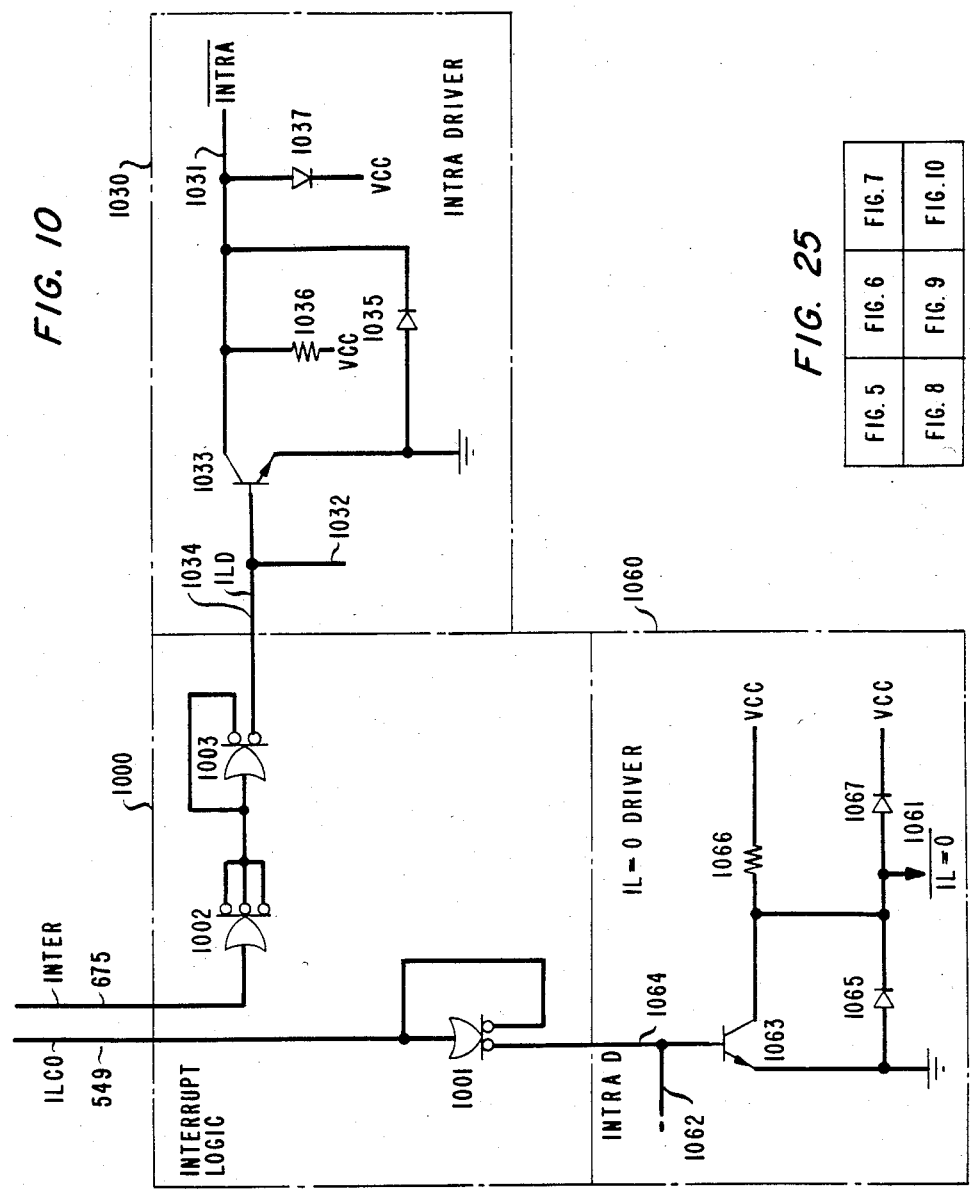

Referring now to FIGS. 3 and 4, there is shown a mode control (MC) circuit 400 for controlling the mode of operation of the telephone set, speech-only or full-feature, is shown. With insufficient power available to operate the set in the full-feature mode the mode control circuit 400 disables the full-feature mode circuits. This state allows for speech-only wherein only the active network circuits 215 are powered. The mode control circuit 400 also reduces the transmit drive current in the speech-only mode to allow for operation at lower set currents and to limit the maximum gain set by an AC equalization circuit located in the active network 215.

The mode control circuit determines when sufficient power is available for full-feature operation by sensing the voltage developed across a resistor in the high current branch of the dc equalization circuit 210. Sensed across the mode control circuit input leads 301 and 302, this voltage is compared against the voltage developed across a resistor that connects across the MODE1 and MODE2 beam leads 304 and 305 respectively. When the voltage across loads 301 and 302 exceeds the voltage at MODE1 and MODE2, sufficient power is available to operate the set in the full-feature mode.

The mode control circuit is comprised of a voltage reference, a comparator with hysteresis and various output circuits. The mode control circuit connects across TP and RP on leads 104 and 105. Other inputs to the mode control circuit are reference currents provided over leads 308, 309 and 310. Output leads consist of lead 311, which limits the maximum gain set by the AC equalization section in the active network circuit 215; lead 312 controls the transmit drive current and lead 313 controls the VCC current source 107, turning it on and off. The L3 rail is powered from the active network internal power supply, VD, instead of VCC. This rail is used by the majority of the remaining logic such as the tone circuitry, the software timers, and the microcomputer interface in the circuit logic. This power rail is turned on only when loop power is present and when VCC is above the upper threshold.

Referring now to FIGS. 5 through 10, there is shown the state control circuits in greater detail. These logic circuits are powered from three separate power rails—L1, L2, and L3. The circuits that are powered from L1 are a sleep latch 700, coin return (CR) latch 750, and the loop status logic 500. The circuits that are powered from the L2 rail are an alpha 1 timer 900, alpha 2 logic 550, interrupt logic 1000, and L2 power-on-reset 950. Circuits that are powered from the L3 rail are the reset pulser 850, the external interrupt logic 1000, and the L3 power-on-reset 810. Output drivers (RESET 600, EX PWR ENBL 630, IL=0 driver 1060, INTRA 1030, and M CLK ENBL 820) and input buffer CR 780 are powered from VCC.

An explanation of the state control circuits can best be presented in terms of their operation by going through their functions in sequence.

During a call origination, when loop power is available and the mode control 400 senses sufficient current to go into the full feature mode, the VCC current supply 107 is turned on, charging the VCC capacitor 117. When VCC reaches the predetermined level, the VCC temperature compensated current source in the power supply is turned on, in turn, turning on the L1 logic circuits, switchhook timer in circuit 218, lower and upper threshold detectors 111 and 113, and the voltage regulator 109. At this time, the sleep latch 700 and the coin return latch 750 are reset by the "0" state of the LT line from the lower threshold detector 111. The external reset lead $\overline{\text{RESET}}$ 601 is held at the "1" state, holding the microcomputer in the reset mode and thereby causing the external power enable $\overline{\text{EX PWR ENBL}}$ lead 551 to be high. The IL=0B output on lead 502 from the mode control informs the loop status logic that loop current is available.

As VCC charges up to the predetermined potential, the lower threshold detector 111 outputs a "1" on the LT lead 501, informing the loop status logic that VCC is at or above the predetermined potential. This removes the reset signal from the sleep latch 700 and the coin return latch 750, allowing them to function. At this time, the L2 logic supply is turned on by the loop status logic 500, enabling a 1 ms clock, the L2 state control circuits, and the external master oscillator which is enabled by a "0" at the $\overline{\text{M CLK ENBL}}$ lead 821. The 1 ms clock starts oscillating, and being a RC oscillator, requires only one to two periods to stabilize. The master clock oscillator, on the other hand, is a quartz oscillator, and may require some time to stabilize. Therefore, the alpha 1 timer circuit 900 is used to inhibit the master clock for 64 ms whenever it is turned on. When the alpha 1 timer 900 times out, the system can then be released to function, ensuring that the master clock is stable at that time. The system goes through this alpha 1 period every time the master clock is turned on after it is turned off, even if the off period is of a short duration.

As the alpha 1 timer times for 64 ms, VCC continues to be charged by the VCC current supply. When VCC reaches the upper threshold, the UT lead 503 from the upper threshold detector 113 goes high. If there is still loop current available as indicated by the IL=0B lead 502 from the mode control 400, the L3 logic supply is turned on, powering the remaining logic circuits in the telephone set. These include the microcomputer interface, the timers, the tone circuitry, and the L3 state control circuitry. The telephone set then functions as a (POTS) set, having speech and dialing capabilities.

When the alpha 1 timer times out and VCC is above the upper threshold, the reset lead changes from a high to a low, enabling the microcomputer 110. The microcomputer then starts executing its program from location zero with the POTS circuits now fully functional. If at this time, the microcomputer 110 decides to turn on other logic circuits such as the coin telephone circuits, the external power enable lead 631 is changed from a "1" to a "0". This will cause the external power enable lead 631 to change from an open circuit to a "0", enabling the coin processing circuitry.

The microcomputer 110 will also read the output of the sleep latch 700 in its initialization program via the microcomputer interface. Since the sleep latch is reset by the lower threshold detector 111, the microcomputer 110 on reading a zero, will start a call origination initialization. To separate other loop interruptions that may occur after a call origination, the microcomputer writes a "1" into the sleep latch, to indicate that any further loop interruptions are not a call origination.

When loop current disappears during a loop interruption, the mode control 400 detects the situation and informs the state control that loop current has diminished below a workable level by outputting a "0" on the IL=0B lead 502. This output is debounced by the loop status logic for one to two milliseconds to filter out frequent loop interruptions that are under one millisecond. The circuit uses the one millisecond clock as the time base with the IL=0B lead 502 from the mode control 400 feeding the reset lead of two D-type flip-flops. The first flip-flop comprises gates 505 through 510. The second flip-flop cmprises gates 511 through 517. In the normal state, the IL=0B lead 502 is high and the flip-flops are held reset. If the IL=0B lead 502 goes low due to a loop interruption, the flip-flops are enabled to count the 1 ms clock. Depending on the timing of the 1 ms clock in relation to the IL=0B lead, the second flip-flop will output a "1" on the DIL=0 lead 504 one to two milliseconds after the IL=0B lead 502 goes low. If the IL=0B lead goes high before the DIL=0 lead goes high, the two flip-flops reset and the sequence starts over again. Once the DIL=0 lead 504 goes high, the IL=0B input to the flip-flops are disabled until the microcomputer 110 has acknowledged the IL=0 interrupt on lead 1061.

When DIL=0 on lead 504 indicates a "1" (loop current=0), the loop status logic immediately turns off the L3 logic supply. The external power enable lead 631 also goes to a high impedance, turning off the coin processing external circuitry. The VCC current source 107 is turned off preventing the discharge of VCC voltage back to TP. An interrupt is generated to the microcomputer by pulling the intra lead 1031 low. Since the microcomputer interface is turned off at this time, there is no way for the microcomputer to communicate with the other telephone circuitry via the microcomputer interface. Therefore, to inform the microcomputer that the interrupt is caused by an IL=0 condition, an output port $\overline{IL=0}$ on line 1061 is connected to microcomputer's I/O latches to indicate that condition. Once the microcomputer 110 reads a low on the $\overline{IL=0}$ lead 1061, it starts an orderly power down sequence. This power down sequence includes the saving of internal program registers, control registers, and the memories, etc. Once the microcomputer has finished its power down sequence, the power stable lead 551 is changed to a "1" by the microcomputer. This signal is used by the loop status logic as a acknowledge signal from the microcomputer that it has recognized an IL=0 condition and has completed its last function before going to sleep. Until that signal is received, the clock powered by the L2 supply is still enabled to furnish the clock signals that the microcomputer requires. The IL=0B lead 502 from the mode control 400 is also disabled from resetting the IL=0 debounce flip-flops until the microcomputer acknowledges the IL=0 condition by driving the power enable lead 551 high. Once power enable is high and if loop power still has not yet returned, the L2 power supply is turned off, leaving the circuitry in its sleep mode.

During the sleep period, the L1 power supply, the state control logic, the receive gain request logic, the VCC temperature compensated current source, the upper and lower threshold detectors 111 and 113, the switchhook timer, and the voltage regulator 109 are the only circuits that are powered from the VCC capacitor 117, drawing a small current. With a selected capacitance value VCC could be maintained at an operate level for about 2 seconds which is the maximum sleep period. If VCC should drop below the operate level, the lower threshold detector 111 would reset the sleep latch 710 and the CR latch 750. Once the sleep latch is reset, the microcomputer 110 will treat the call as a new call when power is returned. Also, if the loop interruption is caused by a handset hangup, the switchhook timer, having timed out for 1.5 seconds, will also reset the sleep latch 700.

If a collect or refund signal is sent to the coin telephone during the sleep period, a negative going pulse will be present at the collect refund input on line 751, setting the coin return latch. When power is returned to the system, the microcomputer will read the content of the latch to see if a collect or refund signal was present while the system was asleep. If the microcomputer reads a one in the latch, a collect refund signal was assumed to be present and the internal coin memories of the microcomputer are cleared. The collect refund latch is then reset by the microcomputer. If the microcomputer reads a zero in the latch, no collect refund signal was assumed and the coin memories are retained to control later generation of coin tones.

When loop power returns, the IL=0B lead 502 from the mode control 400 goes high. If the microcomputer has already acknowledged the IL=0 condition, the power enable lead 551 would have been high. Under these circumstances, the IL=0 debounce flip-flops would be reset by the IL=0B lead 502. There is no debounce requirement of the IL=0B lead 502 on a power return since there are no clock circuits in a loop power return situations. Depending on the length of the loop interrupt, there are 3 different conditions that can exist when loop power returns: the first is when the VCC voltage is greater than the upper threshold and the power supply L2 is still enabled. In this instance, the loop interruption was very short. The microcomputer may not have received the IL=0 interrupt from the IL=0 driver 1060 or it may not have sufficient time to save its internal registers. In this case, the power enable lead 551 is still low, disabling the IL=0B signal from resetting the debounce flip-flops. The state control must wait until the microcomputer raises the power enable lead 551 to a "1" before continuing the next step. Once the power enable signal is a "1", the loop status logic 500 will pull the reset lead 601 low, resetting the microcomputer. A series of gates 521 through 525 will then delay the power enable signal to the IL=0 debounce flip-flops. This will then cause the change of the DIL=0 output on lead 504 to be delayed by four gate delays, in turn, causing the reset lead 601 to be low for four gate delays. This sequence of events is necessary to ensure proper sequencing of the system, making sure that the state control and the microcomputer do not get out of step. Once the IL=0 debounce flip-flops see the delayed power enable signal with IL=0B high, DIL=0 on line 504 becomes low. The loop status logic 500 will then turn the L3 power supply on since VCC is above the upper threshold. The L2 rail is kept on during the entire break period because gate 518, in knowing that loop power really did return, keeps the clock latch, gates 529 and 530 in the loop status logic set, disabling the control of the power enable lead 551 from the clock latch. This permits the system to cycle a short loop interruption without cycling the L2 rail with the 64 ms alpha 1 timer 900.

The second condition that can exist when loop power returns is that the upper and lower threshold voltage levels and the power supply L2 is disabled. This is the most frequent case for a loop interrupt. The power supply L2 is disabled because the microcomputer 110 has recognized the IL=0 condition and has gone to sleep. The clock is off and the entire system is in a sleep mode. As soon as loop current returns, the clock is again enabled by turning the supply L2 on. This is done through the IL=0 debounce flip-flops, with the DIL=0 lead 504 low. A "0" is the DIL=0 lead in combination with a "1" in the lower threshold would set the clock latch, turning the clock on. The alpha 1 timer 900 will be restarted from zero by the L2 power-on-reset circuit 950. The L2 power-on-reset must reset the alpha 1 timer every time power is applied to the oscillator by discharging a power-on-reset timing capacitor 951 every time the oscillator is turned off. Once VCC is charged up to the upper threshold 2.85 V, and alpha 1 has timed out, the L3 logic circuits will be turned on with the external or coin processing circuits controlled by the power enable lead 551 again.

The third condition that can exist when loop power returns is that VCC should fall below this threshold, the system assumes that the microcomputer 110 has lost its internal memories, and the call is assumed to be a new call. The sleep latch is then reset by the lower threshold detector 111. Once VCC reaches the lower threshold, the L2 circuits are turned on, with the alpha 1 timer 900 starting to time for 64 ms again. Once VCC reaches the upper threshold, the L3 circuits are turned on. When the alpha 1 timer times out, the reset lead 601 goes high, releasing the microcomputer to perform its functions.

The loop status logic 500 accepts inputs from the mode control 400, the upper and lower detectors 111 and 113, alpha 2 logic 550, alpha 1 timer 900, and the reset pulser 850 to control the operation of the system. Its output controls the powering of the L2 and L3 power rails, the control of the external master clock chip, the generation of the reset, the control of the L2 power-on-reset, and the control of the VCC current supply via the VCC CS DIS lead 541. Also outputs are generated that drive the interrupt logic which in turn generates the intra and the IL=0 outputs to the microcomputer.

As earlier indicated, LT on line 501 and UT on line 503 are the inputs from the lower and upper threshold detectors. A "1" on these leads indicates that VCC is above the corresponding threshold. A maximum of 1 uA is sunk by the BIL logic on these leads, with a signal swing between one $V_{BE}$ and VCC minus 200 mV. IL=0B on line 502 is a status input from the mode control block. A "0" in this lead indicates that the telephone set has insufficient power to operate in full-feature mode, and a power shut down is in order. A 1 MS clock on lead 540 is used in this section for its IL=0 debounce flip-flops.

The BPE signal on lead 552 is the buffered power enable lead 551 from the alpha 2 logic circuit. A "1" in this lead indicates that the power enable signal is low. The ALPHA 1 TO lead 930 is a logic lead that informs the loop status logic the alpha 1 timer has timed out (64 ms). This lead indicates a "1" when 64 ms has elapsed and will remain in a "1" state until the alpha 1 timer is reset by the L2 POR signal on lead 960. When the L2 logic supply is turned off, the ALPHA 1 TO output 930 will default to the "0" state. PR is an input lead 851 from the reset pulser section 850. A "1" in this lead will cause a reset signal going to the microcomputer via the reset lead 601. This lead is pulsed by the reset pulser for 8 microseconds when the watch dog 1100 discussed later herein timer has timed out.

The output lead 541, VCC CS DIS, is a control lead that goes high when loop interrupt is detected by the loop status logic. A "1" in this lead turns off the output driver of the VCC current supply 107 to prevent the discharge of current from VCC back to TP. L2 CO and L3 CO are control leads 542 and 543 that turn the L2 and L3 supply on when these leads are at a logical "1" respectively. LT1 on lead 544 and LT2 on lead 545 reset the sleep latch and the coin return latch respectively, depending on the LT and SH TO inputs. A "1" in these leads will reset the appropriate latches. The EPED lead 546 is an output signal to the external power enable driver 630. A "1" in this lead will cause external power enable lead 631 to go low, enabling the coin processing circuits.

Leads 547 and 548 are similar to leads 823 and 824. Both drive a push-pull circuit with leads 547 and 548 driving the RESET driver 600 and leads 823 and 824. If the lead 547 is high with lead 548 low, the reset lead 601 will go to VCC. If 547 is low with lead 548 high, reset lead 601 will go to RP the telephone set low reference potential. A similar sequence occurs for the leads 823 and 824 with the clock enable lead 821. The ILCO lead 549 is an output lead driving the interrupt logic 1000. If ILCO is a "0", lead 1061 is a "0". INTER on lead 675 is an output lead that is connected to the interrupt logic 1000 and goes high when the loop status logic 500 wants to interrupt the microcomputer. L2 POR CO on lead 676 is a signal lead that discharges the power-on-reset capacitor 951 of the L2 power-on-reset section. This lead goes high every time L2 is turned off, discharging this capacitor. When L2 is turned on, the output driver for this lead turns off, enabling the capacitor 951 to function.

The collect refund latch 750 is used to latch an external signal such as the collect/refund signal provided by sensor 118 in the coin telephone application. This signal is one that may be received by the set during loop interruptions. This latch may also be used as a general purpose input latch or a memory storage element which is powered at all times to catch other conditions, depending on the user's needs.

The latch is configured as a D-type flip-flop with the D and clock inputs and a Q output going to the microcomputer interface on lead 758. The BC/R input lead 781 is connected to the set lead of the flip-flop, driving the flip-flop to a "1" whenever the BC/R lead 781 is a "0". The flip-flop is reset whenever VCC is lower than the lower threshold (LT2="1"). The microcomputer can also set or reset the flip-flop via data bit 0 on a lead 712. The collect refund input is connected to the set lead of the collect refund latch via the collect refund buffer on lead 781. The collect refund buffer 780 is comprised of a simple emitter coupled pair of transistors 782 and 783 that are powered from VCC via a current source comprised of transistors 785 and resistor 786. The current reference for the current source is derived from line 784 and is reference to the L+1 rail. The input is pulled up to VCC by the collect refund lead when the $\overline{CR}$ lead 788 is held open. A "0" at the CR input will cause the BC/R lead 781 to be a "0", setting the collect refund latch 750.

The sleep latch 700 functions as a memory element that determines whether a call is a new call or an old call. Whenever the telephone set is first powered up, the lower threshold detector 111 will reset the latch via a "1" on the LT1 lead 544. When VCC exceeds the lower threshold, LT1 changes to a "0", enabling the latch 700 to function. Once the microcomputer 110 is functioning, the sleep latch will be set by the microcomputer to keep a tab on the call. If VCC dips below the lower threshold level during a call interrupt, the sleep latch is reset by LT1, informing the microcomputer that power had dipped below the critical working level, and that a new call should be assumed. The switchhook timer will also reset the sleep latch via the SH TO lead 678 if the handset is on hook for more than 1.5 seconds. This is to ensure the system is started afresh when the next customer picks up the phone shortly after the previous customer had just finished. The sleep latch 700 can be written to and read from by the microcomputer via the DBO, $\overline{W11}$, and DOR2 leads 701, 702 and 703 of the microcomputer interface.

The function of the RESET driver 600 is to drive the RESET lead 601, controlled by the loop status logic 500. The circuit consists of an active pull down transistor 602 that is driven by a BIL gate via the lead 548 from the loop status logic and a pull up transistor 603 that is driven via the lead 547 by the loop status logic 500 through a current mirror comprising transistor 604 and 605. When the system is up and running, the lead 601 is normally high. If there is a loop interruption, this lead will go low to hold the microcomputer in a low power state.

The function of the master clock enable driver# 820 is to drive the $\overline{\text{M CLK ENBL}}$ lead 821, controlled by the loop status logic 500. This circuit section is similar to the RESET driver, discussed above. Leads 825 and 826 are used to ensure proper output states at the output transistors 827 and 828. When lead 824 is a "1", $\overline{\text{M CLK ENBL}}$ changes to a "0" to enable the master clock oscillator 119 shown in FIG. 1. If lead 825 is a "1", then lead 821 is a "1" to disable the clock oscillator 119 chip.

The external power enable (EX PWR ENBL) driver 630 consists of an open collector transistor 632 that is saturated when it is appropriate to supply power to the coin telephone logic circuits. Lead 633 ensures the output transistor is off when the EPED lead 546 is a "0". The $\overline{\text{EX PWR ENBL}}$ lead 631 is protected against static discharge by a normally reversed diode 634 connected to T2p or lead 202 in FIG. 2. Therefore, the maximum voltage at the lead is the voltage at T2P to prevent forward biasing the protection diode.

The alpha 2 logic senses the power enable ($\overline{\text{PWR ENBL}}$) input on lead 551 and informs the loop status logic 500. This circuit section comprises an emitter coupled transistor pair 553 and 554 operating as a comparator. This comparator is powered from VCC through a current source comprising transistor 555 and resistor 556 that is biased from line 557. This circuit is designed to be turned off when the L2 rail is turned off. When the $\overline{\text{PWR ENBL}}$ lead 551 is left opened, 558 will pull the common line lead high, causing the BPE lead 552 to go low. If lead 551 is pulled low by the coin processing circuitry in the telephone, lead 552 goes high.

The interrupt logic 1000 accepts interrupt signals from the loop status logic 500, the timer outputs via the INTER input on line 675 and drive the INTRA driver 1030, thus generating an interrupt to the microcomputer. The ILCO input lead 549 is used to drive the IL=0 driver 1060, generating the IL=0 status to the microcomputer. The interrupt logic 1000 does not need to be alive during the sleep period.

The INTRA driver 1030 converts the BIL output from the interrupt logic to CMOS levels for driving themicrocomputer. The circuit is designed to have the output $\overline{\text{INTRA}}$ on lead 1031 active low. The circuit draws no current when it is inactive, and will draw a small current when it is enabled. It is usually in the inactive state, however, and the current drain will be absorbed by the VCC 117 capacitor. Lead 1032 keeps the output transistor 1033 off when lead 1034 is low.

The IL=0 driver drives the $\overline{\text{IL}}$ beam 1061, indicating to the microcomputer that the interrupt is caused by a loop interruption. The circuit is similar to the INTRA driver 1030 described previously with similar input and output specifications.

As earlier indicated, the purpose of the alpha 1 timer 900 is to time for 64 ms every time the clock is turned on and informs the loop status logic 500 that 64 ms has elapsed. The circuit is comprised of six stages of D flip-flops 910 through 916 driven by the 1 MS CLK on lead 540. The output of the last stage is latched by an output flip-flop comprising gates 944 through 949 which drives the ALPHA 1 TO lead 930. A "1" on this lead indicates that the timer has timed out. The counters will continue counting, but the output will remain a "1".

In order to start the timer, a reset pulse is applied to all the flip-flops from the L2 power-on-reset circuit via a "1" on the lead 960. This will reset the output latch, causing it to go to "0". When 64 ms has elapsed, the output latch will be clocked to a "1".

The L2 power-on-reset 950 provides a reset pulse which resets the alpha 1 timer 900 every time the L2 rail is turned on. The reset pulse period is generated by charging a capacitor 951 with a current source. When the capacitor charges to one $V_{BE}$, the reset signal is removed, thus generating a reset pulse. To ensure a reset pulse is generated every time power is turned on, the capacitor 951 is discharged by the loop status logic via a "1" in the L2 POR CO lead 676 every time power to the reset circuitry is turned off. This will ensure that the alpha 1 timer 900 starts from zero when the L2 power is enabled.

The function of the reset pulser 850 is to provide a pulse to the loop status logic 500 when the watch dog timer 1100 times out. The circuit uses a 123.2 kHz signal on line 852 as the time base, generating an output pulse on the PR line 851 whose length is one clock period of the 123.2 kHz signal. This occurs whenever the WDT TO input lead 1101 to the reset pulse 850 has a low to high transition, clocking an internal latch. The output pulse then feeds the loop status logic which generates the $\overline{\text{RESET}}$ pulse via the RESET driver 600. The function of the L3 power-on-reset 810 is to provide a reset pulse for the basic telephone L3 logic. The circuits that use this reset are the reset pulser 850, external interrupt logic, watch dog timer 1100, timers 1 through 3, active network logic, and the tone control. A "1" on the L3 POR lead 811 will reset these logic circuits. The circuit 810 works in the same manner as the L2 power-on-reset 950. The capacitor 812 is not discharged by the loop status, logic 500, however, because a reset pulse is required only when the L3 logic circuit loses its memory states such as when power is removed. The capacitor 812 would also be discharged at this time so that a reset pulse will also be generated at this time. If the logic circuits retain their old states, no reset pulse will be required and no reset pulse will be generated.

Figure 11:
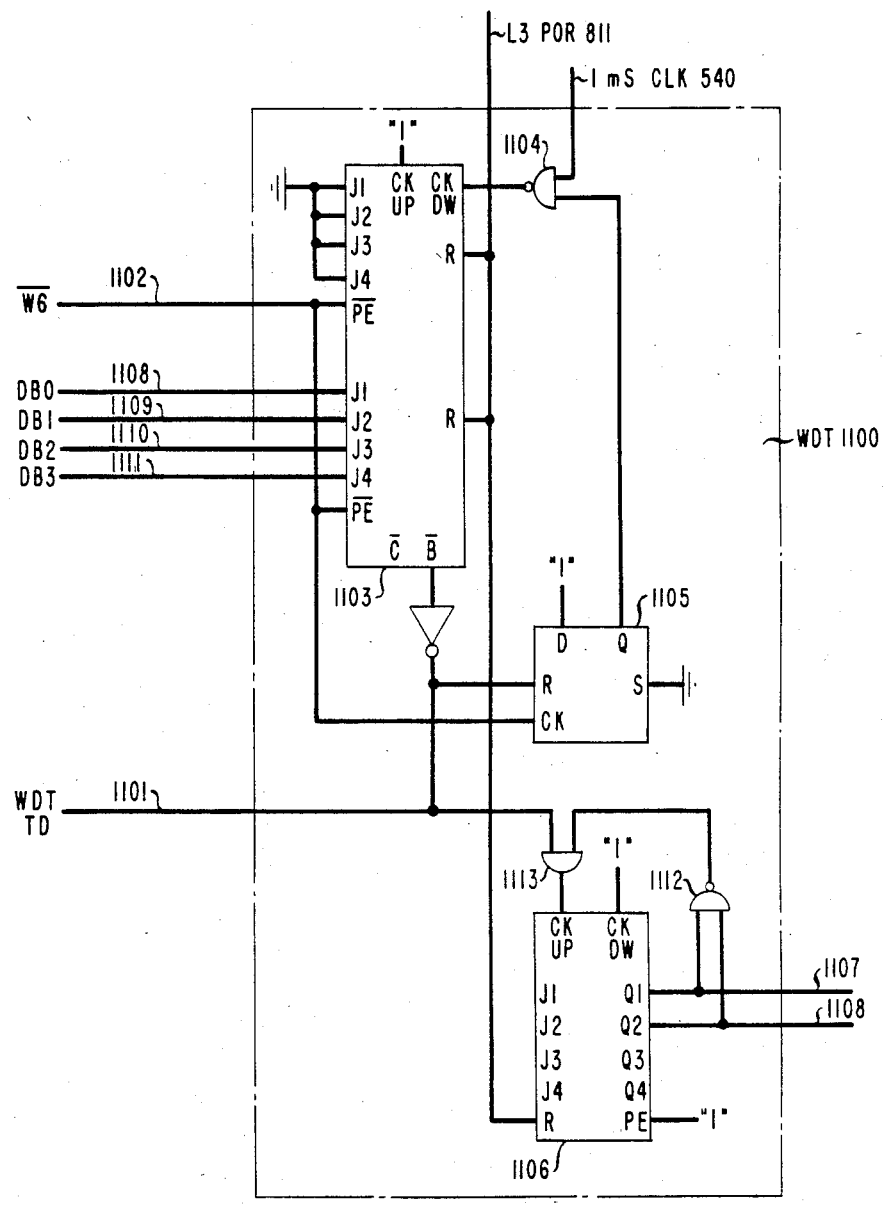
FIG. 11 is a detailed circuit of the watch dog timer employed in this invention.
Figure 12:
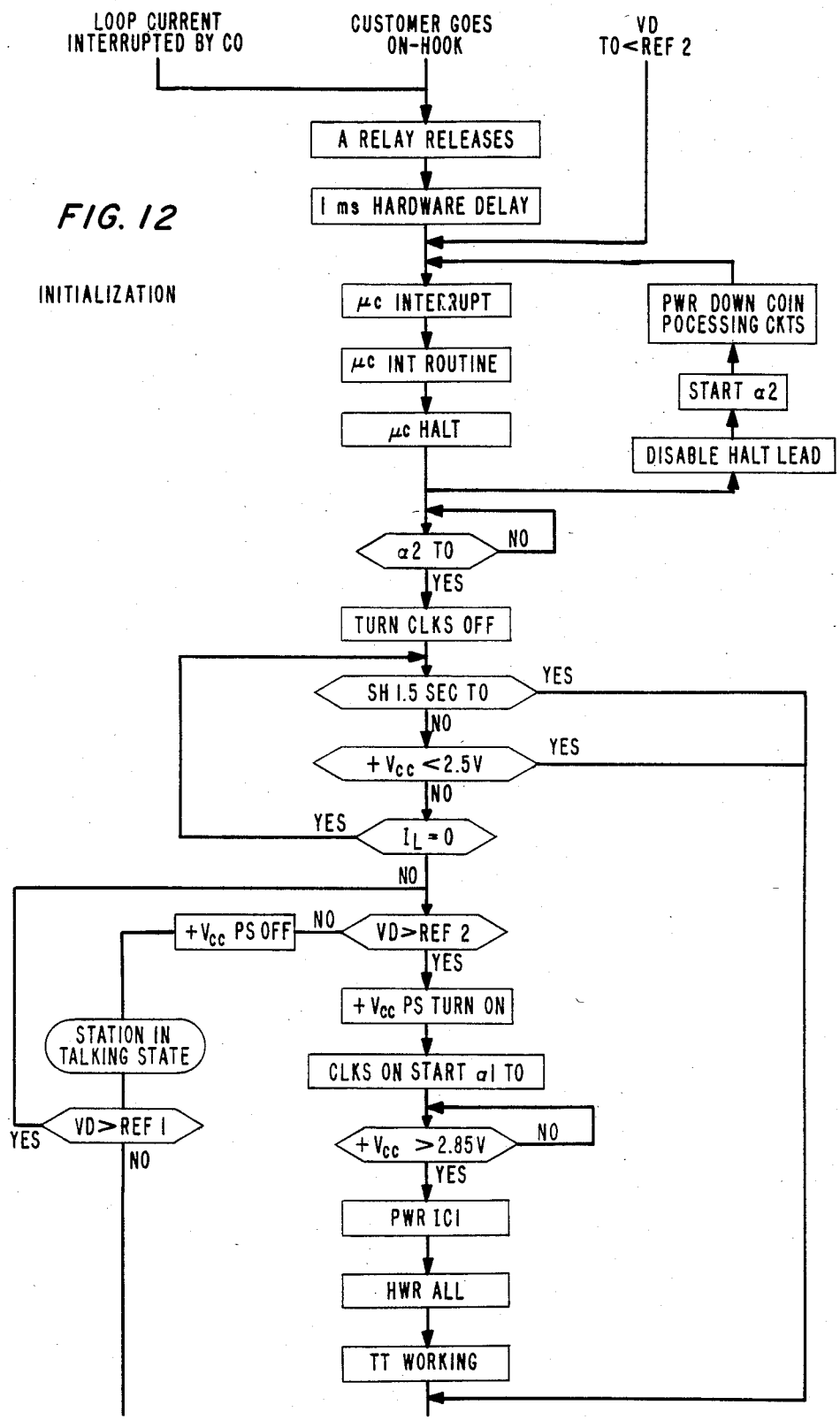
Figure 13:
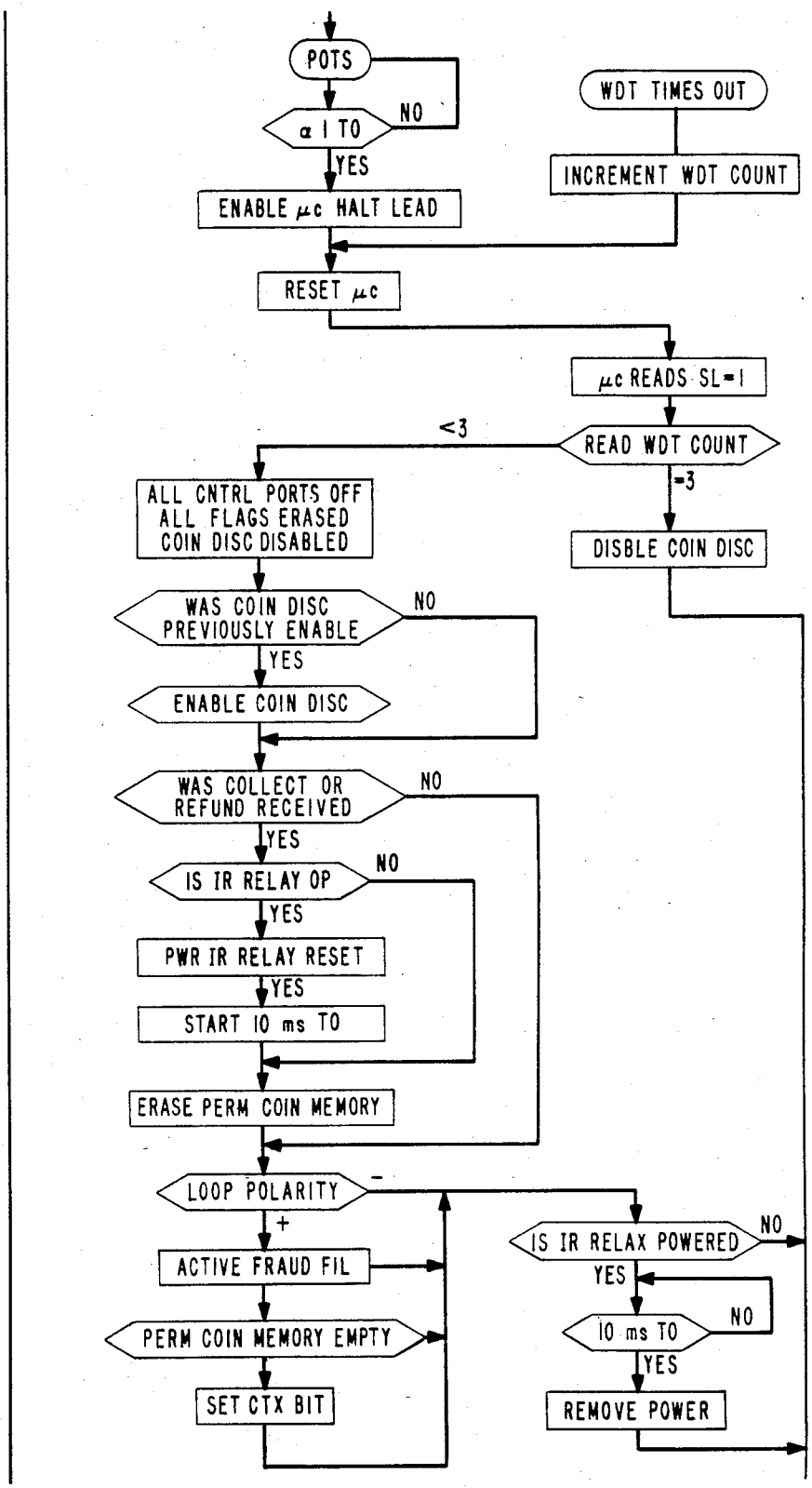
Figure 15:
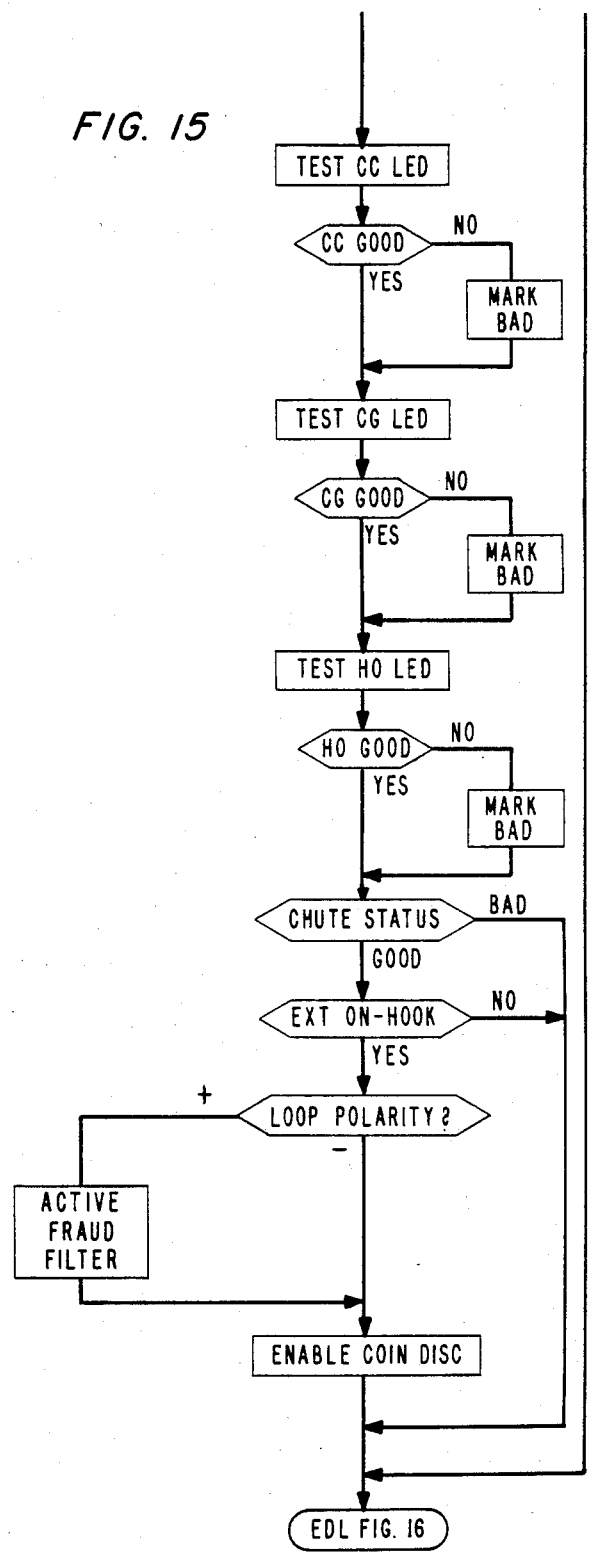
Figure 16:
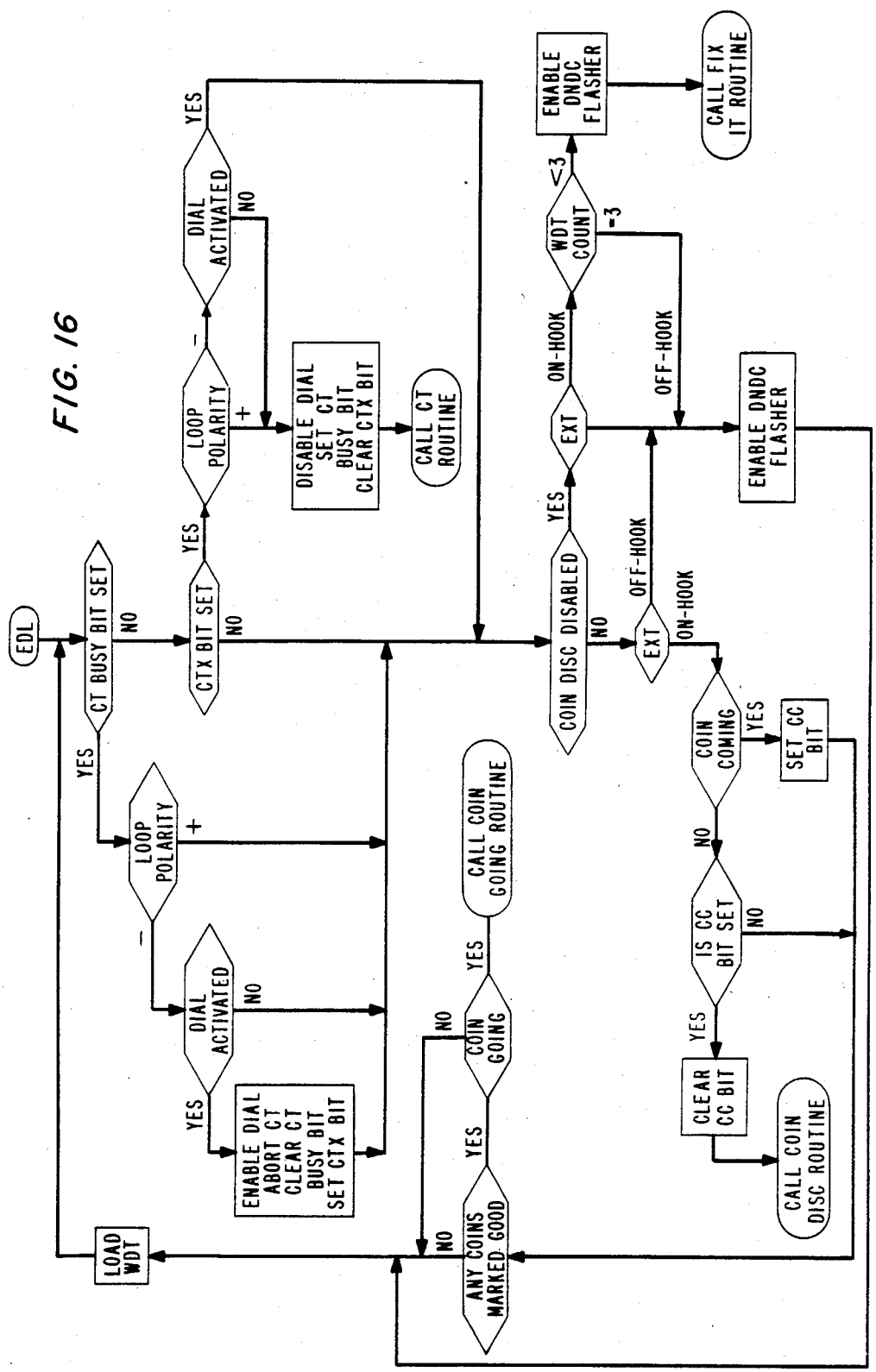
Figure 17:
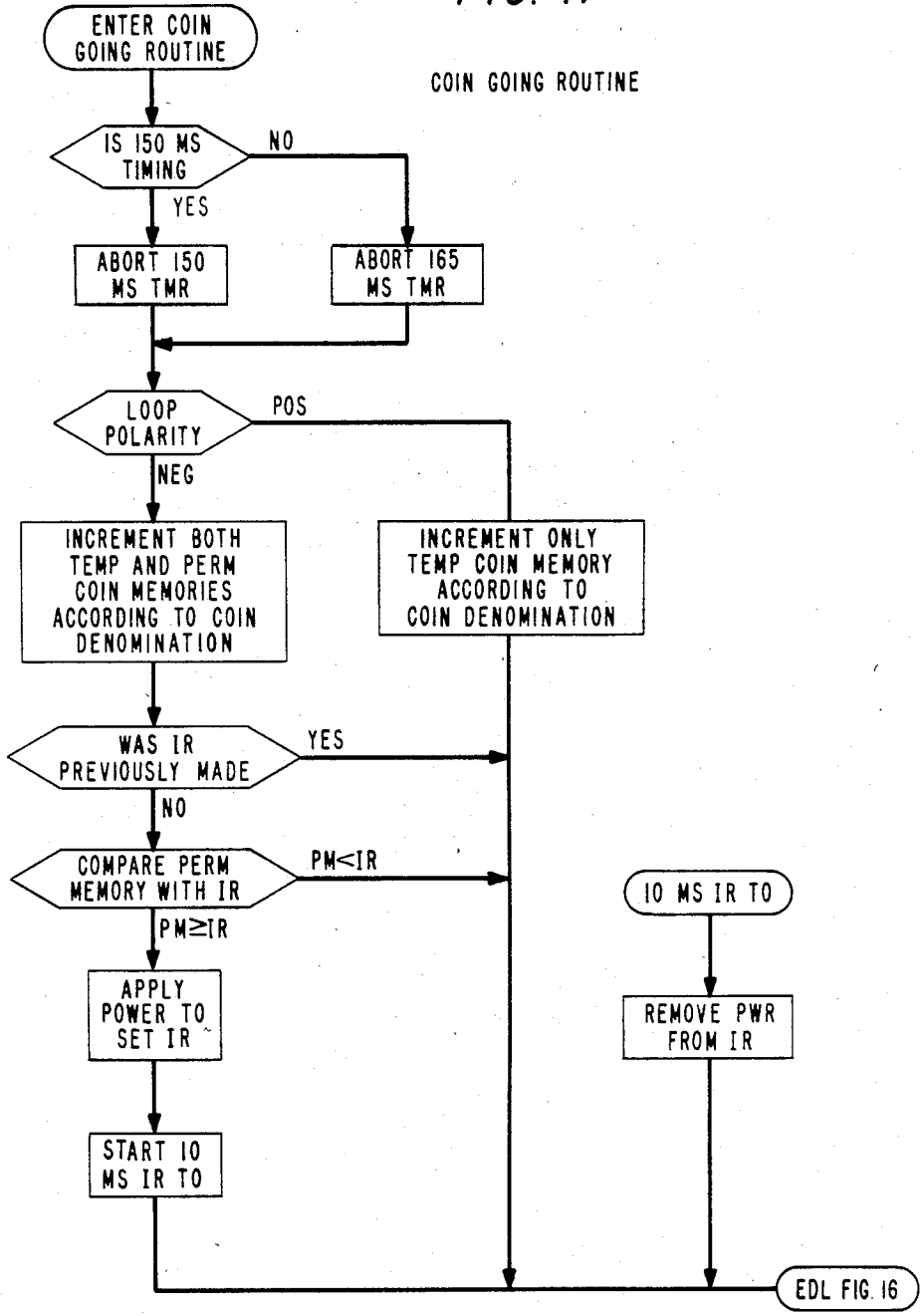
Figure 18:
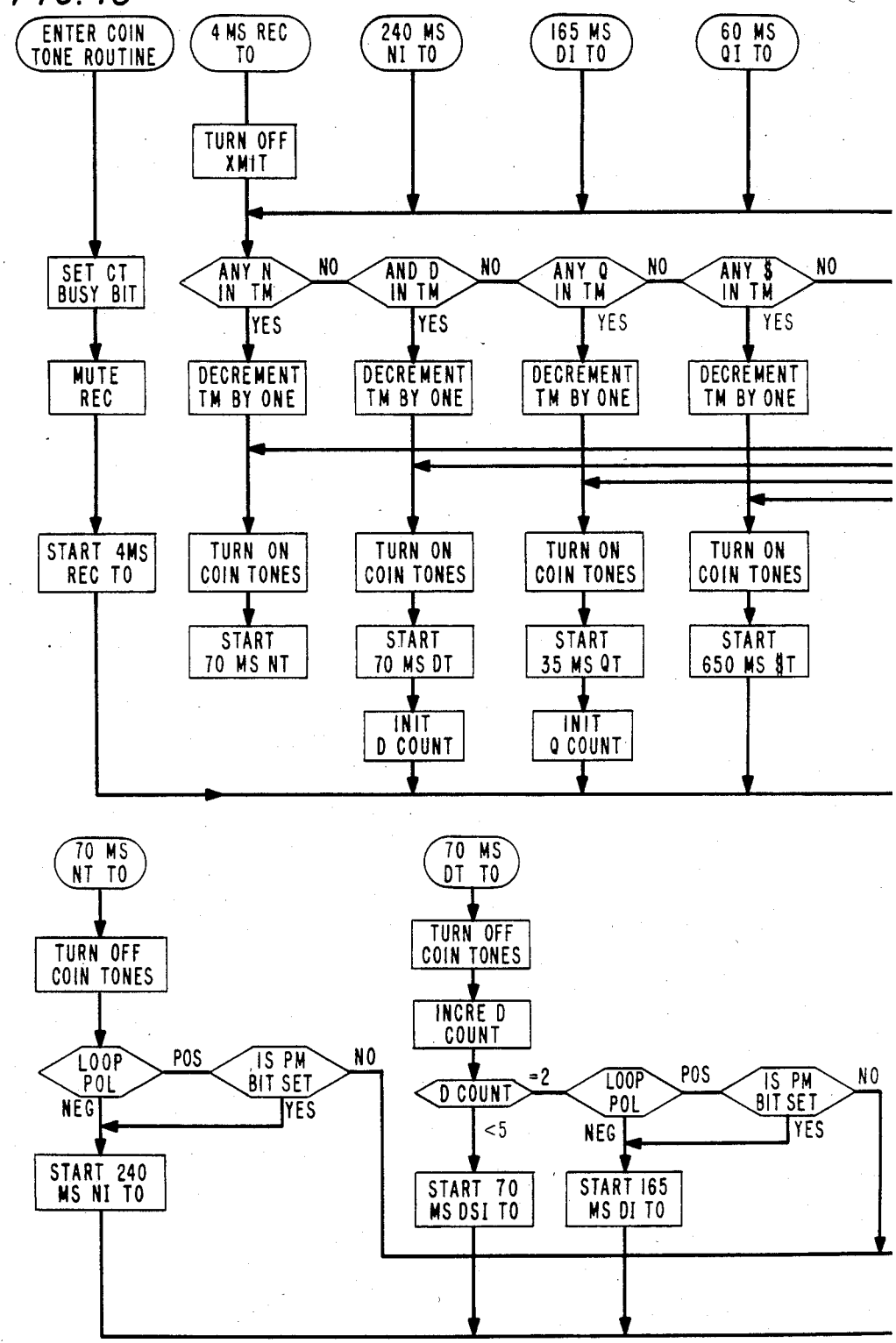
Figure 20:
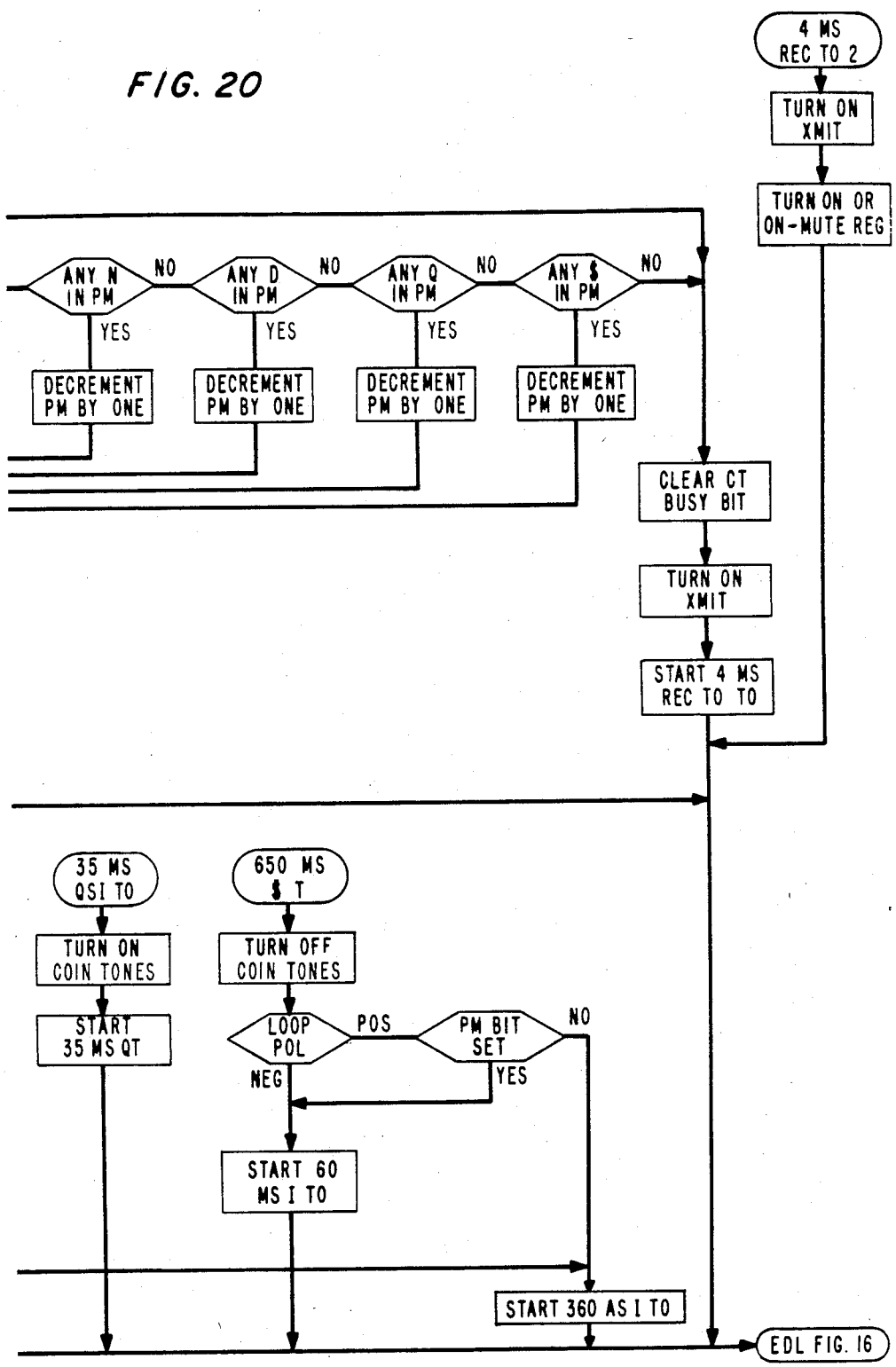

Referring now to FIG. 11, there is shown a watch dog timer (WDT) 110 which is included in the circuit design as a defensive strategy to detect a microcomputer glitch or some type of noncatastrophic failure which causes the microcomputer 110 to temporarily stop functioning. If less than three such glitches occur between loop power interruptions, the watch dog timer 1100 will cause the microcomputer to perform a normal reinitialization after each glitch. After the third glitch, which may indicate a permanent type of failure, the microcomputer will disable the coin features of the telephone and the customer is provided with only a POTS telephone (speech and dial).

The operation of the WDT 110 is as follows. On a call origination, the WDT 1100 is initialized to zero by a power-on-reset and the microcomputer loads one nibble to the most significant counter. This action will enable the WDT 1100 to count to zero. The microcomputer will then perform its normal duty but will periodically reload a nibble to the WDT 1100, before the WDT 1100 times out. This action will recycle the WDT 1100 to time again. If the microcomputer did not reload the nibble in time and the WDT 1100 times out, a glitch situation is assumed, and the microcomputer is restarted from 0 with a reset from the state control 112. This should put the microcomputer back on its normal course, hoping that the glitch will not occur again.

A two bit counter 1106 will count the number of times that the WDT 1100 has timed out. This counter may be read by the microcomputer 110 via the interface to determine the number of times that the WDT 1100 has timed out. In the coin telephone, if the number is more than three, the coin chute is disabled, leaving only the POTS telephone. This WDT 1100 counter is reset every time there is a loop power interruption due to the power-on-reset that occurs each time that loop power comes back.

The WDT 1100 comprises an 8-bit counter 1103 but only the most significant nibble is loadable, with the lower nibble being always loaded to all zeros. Inputs DB0 through DB3 on leads 1108 through 1111 are BIL outputs of the microcomputer interface that sets the upper nibble of the watch dog timer. A pulse on lead 1102 loads the nibble into the counter 1103 when it is at "0". On the positive edge of this pulse, the watch dog timer is enabled to count. If it times out, the WDT TO lead 1101 goes to a "1", sourcing current to the reset pulser circuit 850. Leads 1107 and 1108 are the outputs of the watch dog timer counter which feeds the microcomputer interface, enabling the microcomputer to read the number of times that the watch dog timer 1100 has timed out.

Referring to FIGS. 12 through 20, there is shown flow charts for for some of the functions performed by the circuitry in FIGS. 1 and 2. The sequence in which these functions are performed is indicated by the flow chart, shown in sufficient detail to permit one skilled in the art to duplicate the circuitry of FIGS. 1 and 2 either by programming a microprocessor or by special purpose logic circuitry. Whereas the flow chart shows delay times used in a particular application, it is readily apparent that it will be a simple matter to change the delay times for any other application.

Although an embodiment of the invention has been shown and described, it will be understood that it is but illustrative and that various modifications may be made therein without departing from the spirit and scope of the invention as defined in the appended claim.

What is claimed is:

1. A coin telephone station for making calls to a central office over a coin subscriber loop, the station comprising:
    sensing means for detecting the level of current flow through the subscriber loop to the telephone station;
    coin processing circuitry for recognizing the deposit of coins into the station and transmitting coin deposit information to the central office; and
    control means operably responsive to a signal from the sensing means reflecting that the level of current flow has fallen below a predetermined level, the control means inhibiting the coin processing circuitry and causing all deposited coins to be returned to a customer, the coin telephone station retaining a dial and speech capability while the level of current flow is below the predetermined level.

2. The coin telephone station as in claim 1 further comprising:
    testing means for checking the operational readiness of the telephone station coin processing circuitry for recognizing the deposit of coins into the station and transmitting the coin deposit information to the central office; and
    the control means being operably responsive to a signal from the testing means reflecting that some of the circuitry in the telephone station is inoperative, the control means inhibiting the coin processing circuitry, and causing all deposited coins to be returned to the customer, the control means also providing a trouble indication to the central office and the telephone station retaining its dial and speech capabilities while the circuitry tests inoperative.

3. The coin telephone station as in claim 1 wherein the control means includes a state control for sequencing state control circuitry in the telephone station into predetermined states according to available loop power.

4. The coin telephone station as in claim 3 wherein the control means includes a mode control circuit for selecting between a full feature mode wherein the coin processing circuitry is activated in response to sufficient loop current being available from the central office for operation of the station, and a speech only mode wherein only active network circuits are activated in response to having insufficient loop current available from the central office.

5. The coin telephone station as in claim 4 wherein in the speech-only mode the mode control circuit reduces drive current provided to a voice frequency transmitter for allowing for operation of the transmitter at a reduced current level.

6. The coin telephone station as in claim 4 wherein the mode control detects subscriber loop interruptions between the telephone station and the central office once current flow from the central office to the station is established.

7. The coin telephone station as in claim 6 wherein the control means includes a computer for interrogating and controlling the coin processing circuitry, the sensing means and the state control circuitry.

8. The coin telephone station as in claim 7 including self diagnostic means for continually checking for correct operation of the computer while the station is being powered by current from the central office, detection of an inoperative condition by the diagnostic means causing the coin processing circuitry to be inhibited and the telephone station to have only a dial and speech capability while the inoperative condition persists.

9. The coin telephone station as in claim 7 wherein the sensing means comprise a lower threshold detector for determining when the voltage available from the central office is above a predetermined lower threshold voltage, and an upper threshold detector for determining when the voltage available from the central office is above a predetermined upper threshold voltage.

10. The coin telephone station as in claim 9 wherein the state control circuitry is operatively responsive to the mode control circuit and includes: a sleep latch for measuring the time period of any subscriber loop interruptions and for providing the period of each interruption to the computer; a coin refund latch for providing a signal indication to the computer reflecting whether the central office is providing a collect or refund signal to the station; loop status logic for receiving and processing the combined inputs from the mode control circuit, the upper and lower threshold detectors and the sleep latch; and the loop status logic providing control for the operation of the telephone station.

11. The coin telephone station as in claim 10 wherein the computer executes a power down sequence of a first group of selected state circuitry in the telephone station turning off power to this first group of selected state circuitry when the available loop power diminished below a predetermined operate level, the station including capacitance storage means charged by the current on the subscriber loop when the available loop power is above the predetermined operate level, the capacitance storage means being used to power a second group of selected state circuitry during the period when the available loop power is below the predetermined operate level.

12. The coin telephone station as in claim 11 wherein the second group of selected state circuitry powered by the capacitance storage means include the loop status logic and the lower and upper threshold detectors, the threshold detectors providing a first and a second power reactivation signal to the loop status logic for reactivation of the first group of selected state circuitry reflecting that the available loop power is again above the predetermined operate level.

13. The coin telephone station as in claim 12 wherein the second group of selected state circuitry also includes a switch-hook timer powered by the capacitance storage means for timing the length of time that a handset for the telephone station remains on-hook, the switch-hook timer providing a signal to the loop status logic when the handset is on-hook for reflecting that the reduction in available loop power is due to the call being terminated.

* * * * *